United States Patent
Olivieri et al.

(10) Patent No.: US 12,133,022 B2
(45) Date of Patent: *Oct. 29, 2024

(54) METHODS, SYSTEMS, AND DEVICES FOR PRESENTING AN AUDIO DIFFICULTIES USER ACTUATION TARGET IN AN AUDIO OR VIDEO CONFERENCE

(71) Applicant: Motorola Mobility LLC, Chicago, IL (US)

(72) Inventors: Alexandre Novaes Olivieri, Campinas (BR); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,040

(22) Filed: Mar. 15, 2023

(65) Prior Publication Data

US 2023/0216989 A1 Jul. 6, 2023

Related U.S. Application Data

(63) Continuation of application No. 17/132,154, filed on Dec. 23, 2020, now Pat. No. 11,637,989.

(51) Int. Cl.
*H04N 7/15* (2006.01)
*G06F 3/04817* (2022.01)
*G06F 3/0482* (2013.01)
*G06F 3/14* (2006.01)
*H04L 12/18* (2006.01)
(Continued)

(52) U.S. Cl.
CPC ........... *H04N 7/15* (2013.01); *G06F 3/04817* (2013.01); *G06F 3/0482* (2013.01); *G06F 3/1454* (2013.01); *H04L 12/1831* (2013.01); *H04M 3/42391* (2013.01); *H04N 5/272* (2013.01); *H04N 17/00* (2013.01); *H04M 2201/40* (2013.01); *H04M 2242/12* (2013.01)

(58) Field of Classification Search
CPC .......... H04N 7/15; H04N 5/272; H04N 17/00; H04M 3/42391
See application file for complete search history.

(56) References Cited

U.S. PATENT DOCUMENTS 9,578,073 B2 2/2017 Bader-Natal et al.
9,674,244 B2 6/2017 Katzman et al.
(Continued)

OTHER PUBLICATIONS

"Improve Audio Quality in Zoom", IT Help Harvard; Published Nov. 30, 2020; Viewed online at https://harvard.service-now.com/ithelp/web%20browser?id=kb_article&sys_id=cddd4790db6b889096ab5682ca9619a4.
(Continued)

*Primary Examiner* — Amal S Zenati
(74) *Attorney, Agent, or Firm* — Philip H. Burrus, IV

(57) ABSTRACT

A conferencing system terminal device includes a display, an audio output, a user interface, a communication device, and one or more processors. The one or more processors present an audio difficulties user actuation target upon the display during an audio or video conference occurring across a network and concurrently with a presentation of conference (Continued)

content. Actuation of the audio difficulties user actuation target indicates that audio content associated with the audio or video conference being delivered by the audio output is impaired.

20 Claims, 10 Drawing Sheets

(51) Int. Cl.
*H04M 3/42* (2006.01)
*H04N 5/272* (2006.01)
*H04N 17/00* (2006.01)

(56) References Cited

U.S. PATENT DOCUMENTS

| | | | |
|---|---|---|---|
| 2008/0235592 A1* | 9/2008 | Trauth | G06F 3/0482 715/764 |
| 2011/0060591 A1 | 3/2011 | Chanvez et al. | |
| 2012/0206558 A1 | 8/2012 | Setton | |
| 2015/0264306 A1 | 9/2015 | Marilly et al. | |
| 2015/0264310 A1* | 9/2015 | Krishnaswamy | H04L 12/1827 348/14.12 |
| 2016/0088259 A1 | 3/2016 | Anderson et al. | |
| 2017/0085600 A1* | 3/2017 | Carter | H04L 65/1089 |
| 2018/0241882 A1* | 8/2018 | Lee | H04N 7/147 |
| 2018/0268100 A1 | 9/2018 | Bandameedipalli et al. | |
| 2019/0068389 A1* | 2/2019 | Chitre | H04L 12/1863 |
| 2019/0073490 A1 | 3/2019 | Agrawal et al. | |
| 2021/0104253 A1* | 4/2021 | Jolly | G10L 25/60 |

OTHER PUBLICATIONS

Iperione, Analia, "PCT Search Report", PCT/US2021/058955; Mailed Feb. 16, 2022.
Shobhit, , "How to Use Raise Hand Feature in Microsoft Teams?", Published May 16, 2020; Viewed online at https://www.ilovefreesoftware.com/16/tutorial/how-to-use-raise-hand-feature-in-microsoft-teams.html.
Zenati, Amal , "Final Office Action", U.S. Appl. No. 17/132,154, filed Dec. 23, 2020; Mailed Oct. 14, 2022,.
Zenati, Amal , "NonFinal Office Action", U.S. Appl. No. 17/132,154, filed Dec. 23, 2020; Mailed Apr. 1, 2022.

* cited by examiner

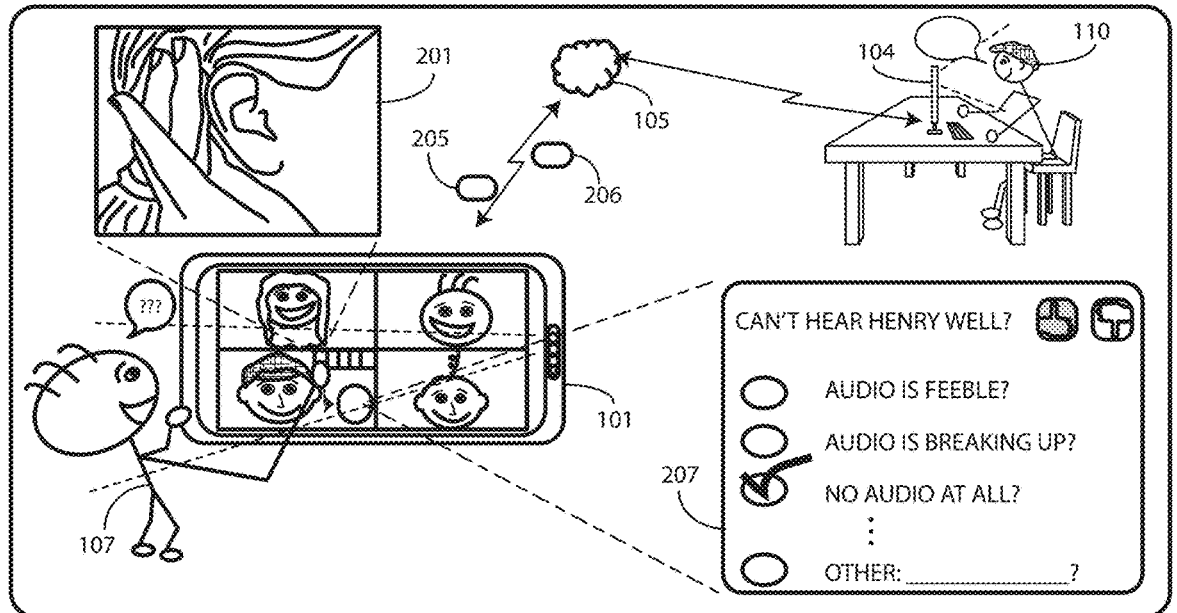
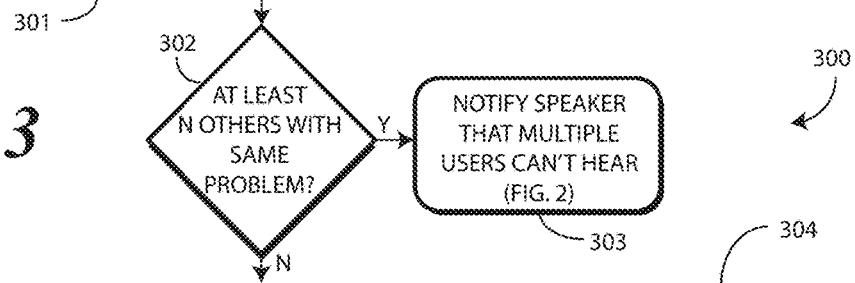
FIG. 3
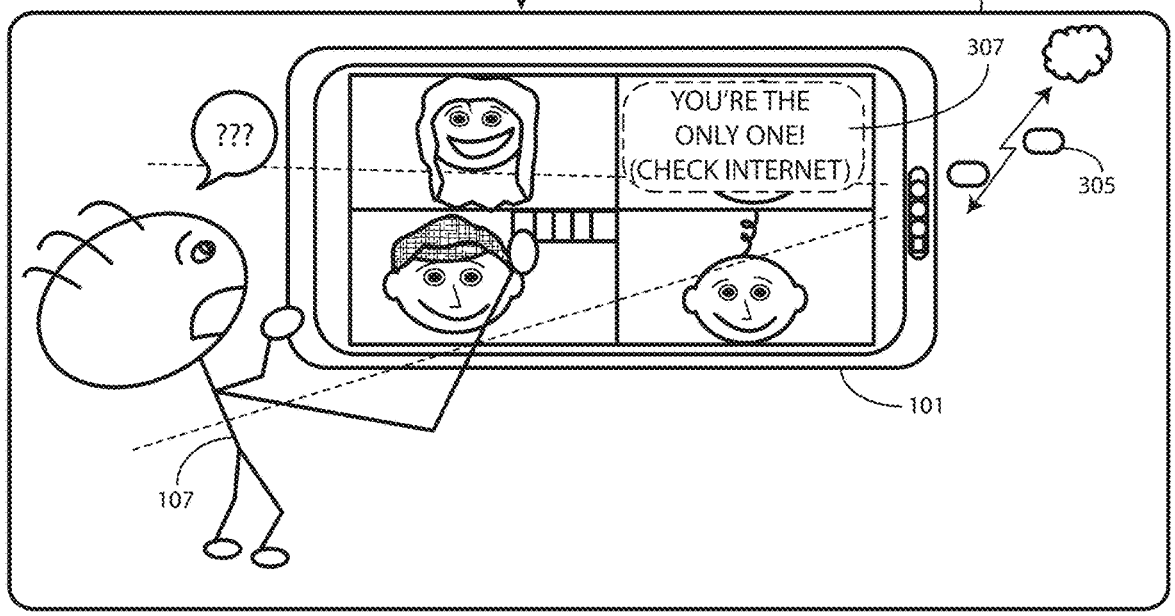

METHODS, SYSTEMS, AND DEVICES FOR PRESENTING AN AUDIO DIFFICULTIES USER ACTUATION TARGET IN AN AUDIO OR VIDEO CONFERENCE

CROSS REFERENCE TO PRIOR APPLICATIONS

This application is a continuation application claiming priority and benefit under 35 U.S.C. § 120 from U.S. application Ser. No. 17/132,154, filed Dec. 23, 2020, which is incorporated by reference for all purposes.

BACKGROUND

Technical Field

This disclosure relates generally to electronic devices, and more particularly to electronic devices capable of providing audio or video conferencing features.

Background Art

Many modern electronic devices, including smartphones, tablet computers, and laptop computers, are capable of engaging in audio conferences or videoconferences with other electronic devices across a network. Users employ such devices to communicate with friends, family, and work colleagues. Participants engage audio or video conferencing to engage in real-time discussions and share electronic content. Video conferencing additionally offers participants the ability to see other participants via video feeds streamed to the participating electronic devices.

While communication device capabilities and network bandwidths are now to a stage where most audio and video conferencing systems work reliably, invariably interconnection problems will arise. It would be advantageous to have improved methods, systems, and devices to make the identification and remediation of issues arising during video or audio conferences simpler and more efficient.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 3 illustrates one or more explanatory method steps suitable for implementation in one explanatory conferencing system configured in accordance with one or more embodiments of the disclosure.

Figure 1:
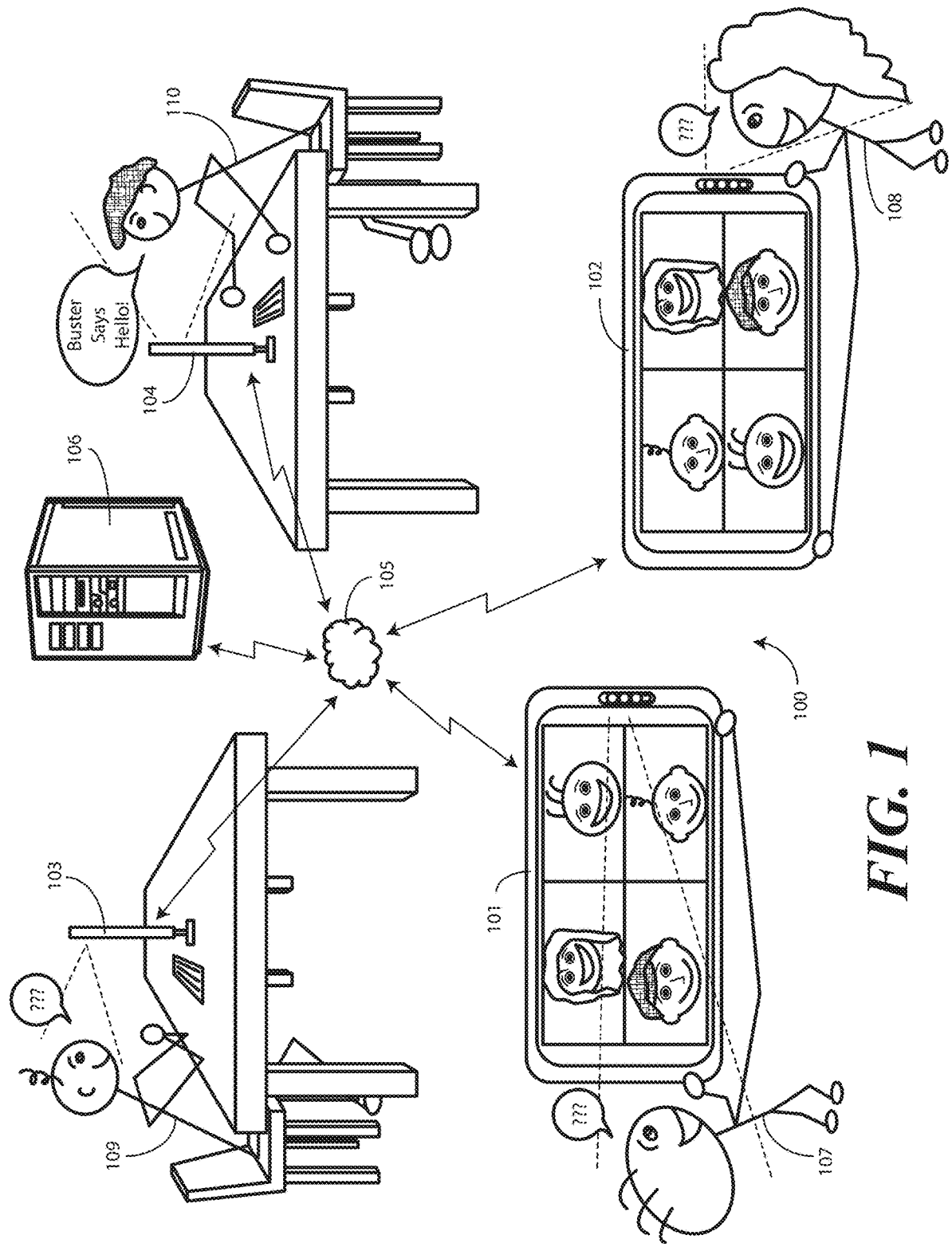
FIG. 1 illustrates one explanatory conferencing system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to presenting an audio difficulties user actuation target upon a display of a conferencing system terminal device, with that audio difficulties user actuation target being presented concurrently with the presentation of conference content in one or more embodiments. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of detecting actuation of an audio difficulties user actuation target by a conferencing system terminal device, presenting an audio difficulties user actuation target upon the display of a conferencing system terminal device, and transmitting or receiving an audio difficulties data communication between conferencing system terminal devices as described herein. The non-processor circuits may include, but are not limited to, a radio receiver, a radio transmitter, signal drivers, clock circuits, power source circuits, and user input devices. As such, these functions may be interpreted as steps of a method to perform utilizing audio difficulties user actuation targets and associated methods to identify instances when audio quality in an audio or video conference is impaired.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide methods, systems, and devices for utilizing audio difficulties user actuation targets to in audio or video conferences to indicate when the audio quality associated with one or more conferencing system terminal devices is impaired. In one or more embodiments, a conferencing system terminal device comprises at least a display, an audio output, a user interface, a communication device, and one or more processors. In one or more embodiments, the one or more processors present an audio difficulties user actuation target upon the display during an audio or video conference occurring across a network. In one or more embodiments, the audio difficulties user actuation target is presented concurrently with the presentation of conference content.

In one or more embodiments, a user can actuate the audio difficulties user actuation target when the audio quality received by their particular conferencing system terminal device is impaired. Illustrating by example, if a user is using a conferencing system terminal device to engage in a video conference, and they see another participant speaking, but cannot hear them, the user can actuate the audio difficulties user actuation target to provide a notification indicating that the audio content associated with the audio or video conference being delivered by the audio output of the conferencing system terminal device is impaired.

Embodiments of the disclosure contemplate that a variety of conditions can make the identification of technical problems or other maladies associated with audio or video conferences challenging. For instance, audio or video conferences, which have now become a common occurrence to allow friends, family, and work colleagues to communicate, may occur across different regions or countries. Accordingly, participants in such audio or video conferences may speak different languages. These participants may connect to the audio or video conference using different types of conferencing system terminal devices, which may range from a simple smartphone to a sophisticated desktop computer. The participants may each connect their respective conferencing system terminal device to the audio or video conference with a network connection having bandwidths and speeds different from those utilized by other participants. Moreover, each participant may engage in the audio or video conference while experiencing background noise or other phenomena affecting audio quality experienced while engaged in the audio or video conference.

While a variety of technical maladies can arise from these various conditions, embodiments of the disclosure contemplate that the most common issue arising in audio or video conference is the impairment of audio content. Illustrating by example, the voice of one participant may not be clear when received as an audio signal by another participant's conferencing system terminal device. Alternatively, one participant may not be able to hear another participant at all. Other audio quality impairments can occur as well, including even the simple case where one participant is speaking so fast in a first language that another participant who is not a native speaker of the first language finds it difficult to comprehend the audio emanating from their conferencing system terminal device.

When such issues arise, embodiments of the disclosure contemplate that it can be difficult to determine the source of the impairment. Audio quality could be impaired because a receiving conferencing system terminal device is having network or other issues. The same impairment, however, could be due to the fact that a sourcing conferencing system terminal device is having network, microphone, or other connection issues. Impairments can even arise from simple factors such as the failure of a speaker to unmute a microphone channel.

Moreover, embodiments of the disclosure contemplate that due to the over polite nature of participants or their cultural norms, when an issue does arise it can continue for quite some time without being addressed. For instance, when multiple participants from multiple countries are engaged in an audio or video conference, audio problems can continue until one brave soul unmutes their microphone (provided they have a working connection) and then asks if any other participants are experiencing the same audio impairment. If others are indeed experiencing the same issue, this provides a basis of confirmation that the issue may stem from something amiss with the presenter's conferencing system terminal device. By contrast, if no one responds, the brave soul identifying the issue may feel embarrassed for interrupting the audio or video conference when the issue was at their conferencing system terminal device all along. Embodiments of the disclosure contemplate that these and other social pressures may result in participants being reticent about identifying the issue because they do not know whether the issue is localized at their conferencing system terminal device or originates somewhere else in the system. Participants may therefore just sit and "wait around" for someone else to identify the issue.

Advantageously, embodiments of the disclosure provide devices, systems, and methods for addressing this issue. In one or more embodiments, one or more processors of a conferencing system terminal device present an audio difficulties user actuation target upon the display of the conferencing system terminal device during an audio or video conference occurring across a network. Each participant then has the ability to actuate the audio difficulties user actuation target when the audio output being delivered by their conferencing system terminal device is impaired. This actuation, which is silent, does not interrupt the audio or video conference while identifying an issue is occurring, thereby eliminating adverse social pressures that may inhibit the participants from identifying the issue.

In one or more embodiments, when a participant in an audio or video conference is speaking and another participant is having issues with the audio output delivering the speakers voice to a conferencing system terminal device, the participant can actuate the audio difficulties user actuation target to identify this fact. In one or more embodiments, the one or more processors can also present an audio difficulties prompt requesting an identification of a type of audio impairment occurring at the audio output of the conferencing system terminal device, e.g., no audio, feeble audio, audio is breaking up, speaker is talking too fast, and so forth.

When this actuation of an audio difficulties user actuation target is affirmed or repeated by other participants, conclusions can be reached that the impairment stems from the conferencing system terminal device of the speaker, rather than the conferencing system terminal device of one particular recipient. Accordingly, an audio or video conferencing system server complex may transmit a message to each conferencing system terminal device indicating that the issue is with the speaker's conferencing system terminal device. By contrast, when the actuation of the audio difficulties user actuation target is singular, or occurs in numbers below a predefined threshold, the audio or video conferencing system server complex may transmit an audio difficulties response data communication indicating that the conferencing system terminal device of the user actuating the audio difficulties user actuation target is causing impairment of the audio content being delivered by the audio output. The audio or video conferencing system server complex may further cause the presentation of a prompt providing one or more corrective actions that may remediate the impairment of the audio content being delivered by the audio output, e.g., check your network connection, turn up your volume, etc.

Embodiments of the disclosure thus advantageously reduce the time required to identify audio impairments occurring in audio or video conferences. Embodiments of the disclosure also streamline and make the process more user intuitive, thereby improving efficiency. Embodiments of the disclosure also reduce perceived or actual participant tension occurring during an audio or video conference when there are audio issues and no participant identifies this fact for some period of time. Accordingly, embodiments of the disclosure help to prevent the continuation of audio maladies long durations. Using embodiments of the disclosure, participants may seamlessly and intuitively identify such issues, thereby providing a relief sentiment to all participants, such as when the case is that the presenter has the issue rather than the multitude of participants attempting to hear the presenter. Other advantages will be described below. Still others will be obvious to those of ordinary skill in the art having the benefit of this disclosure.

Turning now to FIG. 1, illustrated therein is one explanatory audio or video conference system 100 in accordance with one or more embodiments of the disclosure. As shown, multiple participants 107, 108, 109, 110 each employ their own respective conferencing system terminal device 101, 102, 103, 104 to engage with the other participants via the audio or video conference. In this illustrative embodiment, conferencing system terminal devices 101, 102 are shown as smartphones, while conferencing system terminal devices 103, 104 are shown as desktop computers. However, conferencing system terminal devices suitable for use in the audio or video conference system 100 can take other forms as well. For instance, tablet computers, notebook computers, audiovisual devices, mobile phones, smart watches, or other devices can be used by participants to engage in the audio or video conference as well. Other examples of conferencing system terminal devices will be obvious to those of ordinary skill in the art having the benefit of this disclosure.

As shown in FIG. 1, each conferencing system terminal device 101, 102, 103, 104 is engaged in wired or wireless communication with each other across a network 105, one example of which is the Internet via the World Wide Web. It should be noted that the network 105 could be a public, private, local area, wide area, or other type of network across which wired or wireless electronic communications can be exchanged.

In this illustrative embodiment, each conferencing system terminal device 101, 1201, 103, 104 is also in communication with an audio or video conferencing system server complex 106 across the network 105. As will be described in more detail with reference to FIG. 9 below, in one or more embodiments audio or video conferencing system server complex 106 includes components such as a web server, a database server, an audio server, and optionally a video server (the video server may be omitted for audio only conferencing systems) that are operable to facilitate audio or video conferences between the various conferencing system terminal devices 101, 102, 103, 104 of the audio or video conference system 100. These components of the audio or video conferencing system server complex 106 can be combined on the same server. Alternatively, these components can be distributed on any number of servers to increase load handling capacity beyond that of a single server, and so forth. Other configurations for the audio or video conferencing system server complex 106 will be obvious to those of ordinary skill in the art having the benefit of this disclosure.

In one or more embodiments, the audio or video conferencing system server complex 106 performs functions such as maintaining a schedule of audio or video conferences, maintaining lists of participants, as well as allowing each participant's conferencing system terminal device to engage with the audio or video conference, and so forth. In one or more embodiments, the audio or video conferencing system server complex 106 also facilitates the transmission of audio and video content during the occurrence of the audio or video conference.

In one or more embodiments, the audio or video conferencing system server complex 106 functions as an intermediary device to facilitate sharing of audio and/or video content and/or data between the various conferencing system terminal devices 101, 102, 103, 104. For example, as can be seen on the displays of conferencing system terminal devices 101, 102, in this example each participant 107, 108, 109, 110 can see conference content associated with the audio or video conference. In the illustrative example of FIG. 1, the participants 107, 108, 109, 110 are engaged in a videoconference. Since the participants 107, 108, 109, 110 are engaged in a videoconference, each can see conference content in the form of a combined video feed from each other participant 107, 108, 109, 110 presented on the display of each conferencing system terminal device 101, 102, 103, 104, as well as a video feed of themselves. Under ordinary conditions, each participant 107, 108, 109, 110 can hear an audio feed from each other participant 107, 108, 109, 110 as well.

While a videoconference will be used below to illustrate various embodiments of the disclosure, it should be noted that the devices, methods, and systems described herein could equally be used with audio only conferencing systems. Illustrating by example, in such a system, rather than a display of each conferencing system terminal device 101, 102, 103, 104 presenting video content as shown in FIG. 1, in other embodiments only the participant's name or display profile may be presented. Alternatively, each conferencing system terminal device 101, 102, 103, 104 may be engaged in content sharing without the inclusion of video content, and so forth.

In this illustrative embodiment, participant 110 is acting as a presenter, and is speaking, noting that a friend, Buster, "says hello." The presenter's conferencing system terminal device 104 receives this audio and captures video of the presenter and transmits the same to the other conferencing system terminal devices 101, 102, 103 via the audio or video conferencing system server complex 106. While participant 110 is the presenter at the moment, it is to be understood that the presenter role can be changed throughout the videoconference as well, with each other participant 101, 102, 103 taking the role of presenter at other times as situations warrant.

In the audio or video conference of FIG. 1, there is a problem, however, as none of participants 107, 109, 109, who may be situated at disparate locations, in different countries, or otherwise, can hear the presenter. While they can see the presenter on the displays of their respective conferencing system terminal devices 101, 102, 103, there is no audio associated with that conference content.

As noted above, a variety of conditions cause this issue. The fact that multiple conditions can give rise to the problem can also make the identification of the problem challenging for the participants 107, 108, 109, 110. This is true because the participants 107, 108, 109, 110 may speak different languages. Moreover, the capabilities of each conferencing system terminal device 101, 102, 103 experiencing the problem may have different capabilities. The communication channels by which the conferencing system terminal devices 101, 102, 103 connect with the audio or video conferencing system server complex 106 and/or the presenters conferencing system terminal device 104 may bandwidths and speeds different from those utilized by other participants. Moreover, each participant 107, 108, 109 may engage in the videoconference while experiencing background noise or other environmental phenomena affecting audio quality experienced while engaged in the videoconference.

When such issues arise, with the participants 107, 108, 109 all sequestered in different locations, it can truly be difficult to determine the source of the impairment. Illustrating by example, participant 107 may think he is the only one experiencing the issue, and may begin an extensive local troubleshooting process before alerting any of the other participants 108, 109, 110 to the fact that he is having a problem. The other participants 108, 109 may act in a similar manner. The same impairment, however, could be due to the fact that the conferencing system terminal device 104 of the presenter is having network, microphone, or other connection issues. Impairments can even arise from simple factors such as the failure of the presenter to unmute a microphone channel at his conferencing system terminal device 104.

For these and other reasons, it may take an extensive amount of time for anyone to identify that an audio problem is occurring. Illustrating by example, many people have an overly polite disposition or come from cultures where interrupting the presenter in the midst of his sharing tidings of joy from Buster may be considered to be impolite. Accordingly, the issue may go on unresolved until one participant says something (provided their conferencing system terminal device is not the source of the problem. For instance, participant 108 may ask, "can anyone hear participant 110?" Alternatively, participant 108 may open a chat window, type in that same question, and then wait to see if anyone responds.

Each of these options is less than desirable. It may take many minutes of valuable time for someone to finally speak up. If that person's conferencing system terminal device is the source of the problem, there braveness may be for naught since no one else will hear their identification of the problem. Opening a chat window, typing in extensive text, and hitting send can be both cumbersome and time consuming. On electronic devices with smaller screens, such as those on smartphones, opening a chat window could require a participant to momentarily transition from a primary presentation of a video conference to enter chat commands. Doing so may cause the participant to miss important information being shared by a presenter. Moreover, others may not have their chat windows open and may fail to see anything even if participant 108 goes to all the trouble to try and communicate without audio.

Advantageously, embodiments of the disclosure provide devices, systems, and methods for addressing this issue in a more efficient, seamless and intuitive manner. In one or more embodiments, one or more processors of each conferencing system terminal device 101, 102, 103 are configured to present an audio difficulties user actuation target upon the display of each conferencing system terminal device 101, 102, 103 while the videoconference occurs across the network 105. Each participant 107, 108, 109 then has the ability to actuate the audio difficulties user actuation target when the audio output being delivered by their conferencing system terminal device is impaired. This actuation, which is silent, does not interrupt the videoconference or the speaker. However, it succeeds in identifying that an issue is occurring, thereby eliminating adverse social pressures that may cause a delay in any one participant 107, 108, 109 identifying the lack of audio from the presenter.

In one or more embodiments, when a participant, which may be one or more of participants 107, 108, 109 in this example, is having issues with the audio output delivering the speakers voice to their conferencing system terminal device 101, 102, 103, that participant 107, 108, 109 can actuate the audio difficulties user actuation target to identify this to other participants.

Figure 2:
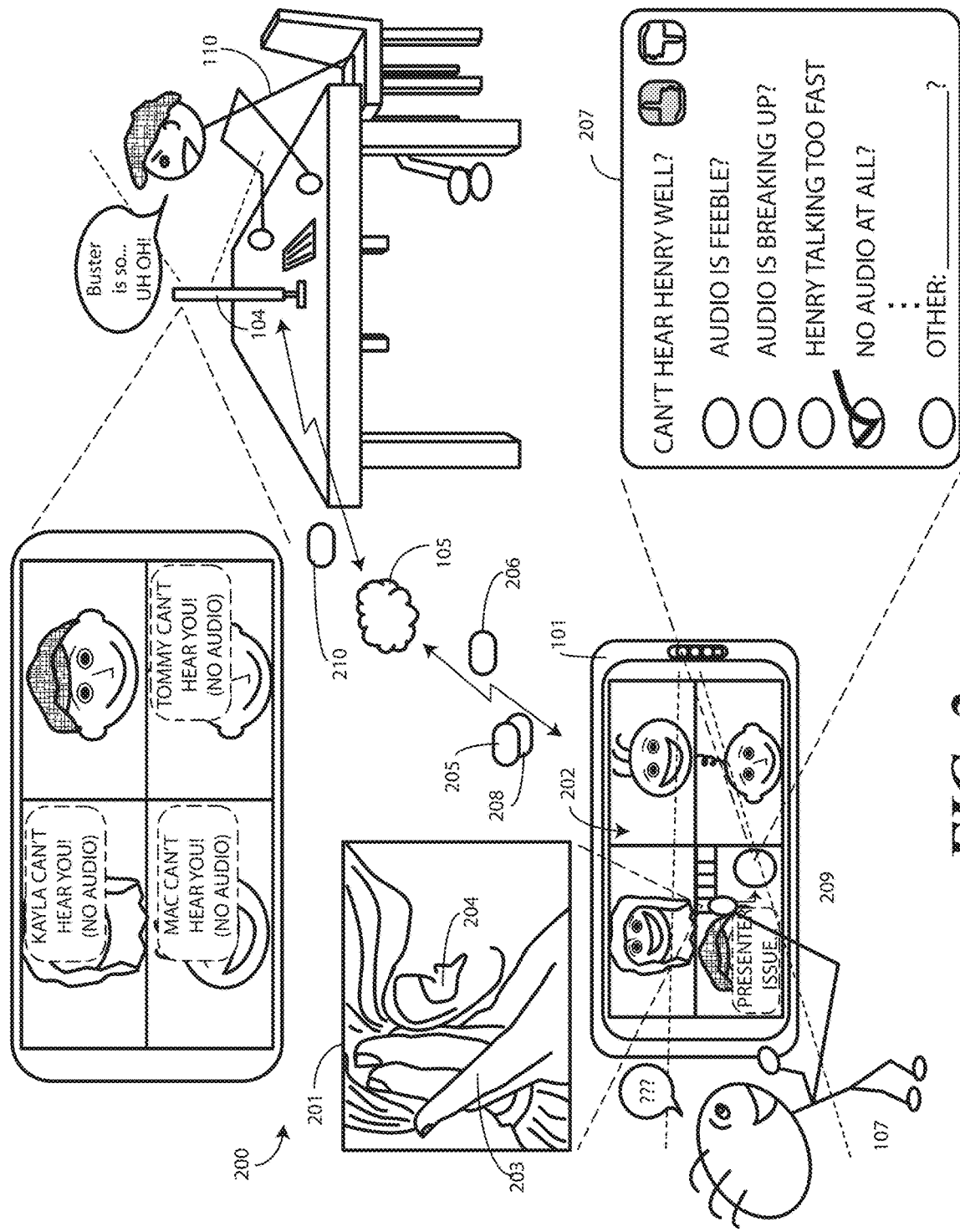
FIG. 2 illustrates portions of one explanatory conferencing system in accordance with one or more embodiments of the disclosure.

Turning now to FIG. 2, illustrated therein is a subset 200 of the video conference system (100) of FIG. 1 illustrating how this can occur. As shown, one or more processors of the conferencing system terminal device 101 being used by participant 107 presents an audio difficulties user actuation target 201 upon the display of the conferencing system terminal device 101 during the videoconference. In this illustrative embodiment, the one or more processors present the audio difficulties user actuation target 201 on the display of the conferencing system terminal device 101 concurrently with the presentation of conference content 202.

In this illustrative embodiment, the audio difficulties user actuation target 201 comprises an interactive icon presented along the display of the conferencing system terminal device 101, which is touch sensitive. In one or more embodiments, the icon defining the audio difficulties user actuation target 201 depicts a hand 203 positioned by an ear 204. However, it will be obvious to those of ordinary skill in the art having the benefit of this disclosure that the audio difficulties user actuation target 201 can take other forms as well. For instance, the audio difficulties user actuation target could depict a hazardous condition sign, a loudspeaker with a red circle and slash superimposed thereon, a depiction of an ear with a slash therethrough, or a picture of headphones with a slash thereacross.

Since participant 107 cannot hear participant 110, he delivers user input to the conferencing system terminal device 101 by touching the display of the conferencing system terminal device 101 at a location corresponding to the audio difficulties user actuation target 201. In one or more embodiments, this actuation of the audio difficulties user actuation target 201 indicates that audio content associated with the videoconference being delivered by the audio output, one example of which is a loudspeaker, of the conferencing system terminal device 101 is impaired.

In one or more embodiments, the one or more processors of the conferencing system terminal device 101 detect this actuation of the audio difficulties user actuation target 201 from the display, which serves as a primary user interface of the conferencing system terminal device 101. In one or more embodiments, in response to this actuation detection, the one or more processors of the conferencing system terminal device 101 cause a communication device of the conferencing system terminal device 101 to transmit an audio difficulties data communication 205 across the network 105. The one or more processors of the conferencing system terminal device 101 may cause the communication device of the conferencing system terminal device 101 to transmit the audio difficulties data communication 205 across the network 105 to the other conferencing system terminal devices engaged in the videoconference, e.g., to conferencing system terminal device 104. However, in one or more embodiments the one or more processors of the conferencing system terminal device 101 cause the communication device to transmit the audio difficulties data communication 205 across the network 105 to the audio or video conferencing system server complex (106), and in particular to an audio difficulties monitoring engine operating at the audio or video conferencing system server complex (106).

In one or more embodiments, in response to this actuation detection, the one or more processors of the conferencing system terminal device 101 perform other operations as well. For instance, in one or more embodiments to further diagnose possible issues associated with the problem, the one or more processors of the conferencing system terminal device 101 additional present an audio difficulties prompt 207 at the display of the conferencing system terminal device 101 in response to detecting the actuation of the audio difficulties user actuation target 201.

In one or more embodiments, the audio difficulties prompt 207 requests a confirmation that the audio content associated with the videoconference being delivered by the audio output of the conferencing system terminal device 101 is impaired. In this illustrative embodiment, the audio difficulties prompt 207 says, "Can't Hear Henry (participant 110 as identified by the audio or video conferencing system server complex 106) Well?" Thereafter, a thumbs-up check box and a thumbs-down checkbox are provided. The participant 107 can deliver user input to select the proper thumbs box so that the one or more processors of the conferencing system terminal device 101 can include this confirmation information (where selected) with the audio difficulties data communication 205 transmitted across the network 105.

In one or more embodiments, the audio difficulties prompt 207 also, or alternatively, requests an identification of an audio impairment type occurring at the audio output of the conferencing system terminal device 101. Illustrating by example, in the illustrative embodiment of FIG. 2, the audio difficulties prompt 207 includes a list of audio impairment types under the heading "Can't Hear Henry Well?" In one or more embodiments, the audio difficulties prompt 207 requests a selection of at least one predefined audio impairment from a plurality of predefined audio impairments.

In this illustrative example, these predefined audio impairment types include "Audio is Feeble," "Audio is Breaking Up," "Henry Talking Too Fast," and "No Audio at All." This particular audio difficulties prompt 207 also includes at least one user customizable audio impairment type where the participant 107 can type in an impairment type when it is not provided in the list of predefined audio impairment types. It should be noted that these audio impairment types, i.e., weak audio, no audio, intermittent audio, and presenter speaking too quickly, are illustrative only. Other types of predefined audio impairment types suitable for presentation in the audio difficulties prompt 207 will be obvious to those of ordinary skill in the art having the benefit of this disclosure.

In this illustrative embodiment, each audio impairment type presented in the list of predefined audio impairment types includes a check box adjacent thereto. The participant 107 can deliver user input to select the proper predefined audio impairment type so that the one or more processors of the conferencing system terminal device 101 can include this information with the audio difficulties data communication 205 transmitted across the network 105. Specifically, in one or more embodiments the one or more processors of the conferencing system terminal device 101 receive the selection of the at least one predefined audio impairment when made by the participant 107. Thereafter, in response to the selection, the one or more processors of the conferencing system terminal device 101 can cause the communication device of the conferencing system terminal device 101 to transmit an audio impairment identification message 208 to the audio difficulties monitoring engine operating at the audio or video conferencing system server complex (106).

In one or more embodiments, the one or more processors of the conferencing system terminal device 101 thereafter receive, with the communication device from the audio difficulties monitoring engine of the audio or video conferencing system server complex (106), an audio difficulties response data communication 206. The audio difficulties response data communication 206, and subsequent audio difficulties response data communications received by the communication device of the conferencing system terminal device 101, can cause the one or more processors of the conferencing system terminal device 101 to perform a variety of functions.

Illustrating by example, when the actuation of the audio difficulties user actuation target 201 is singular, or occurs in numbers below a predefined threshold, the audio or video conferencing system server complex (106) may transmit an audio difficulties response data communication 206 indicating that the conferencing system terminal device 101 of the participant 107 actuating the audio difficulties user actuation target 201 is the source of impairment of the audio content being delivered by the audio output of the conferencing system terminal device 101. One example of this is described below with reference to FIG. 3. The audio difficulties response data communication 206 received from the audio or video conferencing system server complex (106) may further cause the one or more processors of the conferencing system terminal device 101 to present a prompt providing one or more corrective actions that may remediate the impairment of the audio content being delivered by the audio output, e.g., check your network connection, turn up your volume, etc. One example of such a prompt will be described below with reference to FIG. 4.

In the illustrative example of FIG. 2, the actuation of the audio difficulties user actuation target 201 has been affirmed or repeated by other participants. For instance, the other participants (108, 109) may also actuate audio difficulties user actuation targets presented on the displays of their conferencing system terminal devices (102, 103). Alternatively, as described below with reference to FIG. 11, the other participants (108, 109) may "like" or otherwise affirm an indication that participant 107 has actuated the audio difficulties user actuation target 201 presented on his conferencing system terminal device 101.

Where this occurs, i.e., where there is confirmation or a repeating of actuations of audio difficulties user actuation targets from a sufficient number of participants, conclusions can be reached—by other participants, by the audio or video conferencing system server complex (106), or combinations thereof—that the impairment stems from the conferencing system terminal device 104 of the presenter rather than the conferencing system terminal device 101 of one particular recipient, e.g., participant 107. Accordingly, the audio or video conferencing system server complex (106) may transmit a message to each conferencing system terminal device, and in particular the conferencing system terminal device 104 of the presenter, indicating that the issue is with the conferencing system terminal device 104 belonging to the presenter.

In the illustrative embodiment of FIG. 2, the one or more processors of the conferencing system terminal device 101 belonging to participant 107 receives, with the communication device of the conferencing system terminal device 101 from the audio difficulties monitoring engine of the audio or video conferencing system server complex (106), an audio difficulties response data communication 206 indicating that operation of the conferencing system terminal device 104 of the presenter is causing the impairment of the audio content being delivered by the audio output of the conferencing system terminal device 101. Accordingly, the one or more processors of the conferencing system terminal device present a prompt 209, which is superimposed upon the video feed of participant 110, to quickly and easily identify that the conferencing system terminal device 104 of participant 110 is causing the impairment of the audio content.

In this illustrative example, the audio or video conferencing system server complex (106) also transmits an audio difficulties response data communication 210 to the conferencing system terminal device 104 of participant 110 indicating that the other participants 107, (108, 109) are unable to hear his good tidings from Buster. Accordingly, without any processing or decision making by the audio or video conferencing system server complex (106), in seeing that no one can hear him, participant 110 instantly recognizes that it must be his conferencing system terminal device 104, or its connection to the network 105, that is causing the problem. Participant 110 can then take steps to remediate the issue and get the videoconference back on track.

As shown in FIG. 2, embodiments of the disclosure thus advantageously reduce the time required to identify audio impairments occurring in audio or video conferences. Embodiments of the disclosure also streamline and make the process more user-intuitive, thereby improving efficiency. Embodiments of the disclosure also reduce perceived or actual participant tension occurring during an audio or video conference when there are audio issues and no participant identifies this fact for some period of time. Accordingly, embodiments of the disclosure help to prevent the continuation of audio maladies long durations. Using embodiments of the disclosure, participants may seamlessly and intuitively identify such issues, thereby providing a relief sentiment to all participants, such as when the case is that the presenter has the issue rather than the multitude of participants attempting to hear the presenter.

Turning now to FIG. 3, illustrated therein are one or more steps of a method 300 occurring in accordance with one or more embodiments of the disclosure. In one or more embodiments, a decision regarding whether a presenter conferencing system terminal device or another conferencing system terminal device is the source of the audio difficulties is determined by the number of participants experiencing the problem. Illustrating by example, if only one participant actuates the audio difficulties user actuation target, their conferencing system terminal device, or its connection to the videoconference, is likely the cause of the audio difficulties. However, if more participants report the same issue, in one or more embodiments the presenter and all of the participants can be notified of the issue as described above with reference to FIG. 2 and, optionally, informed of corrective measures proposed to address the issue. The method 300 of FIG. 3 deals with the former situation Beginning at step 301, one or more processors of the conferencing system terminal device 101 being used by participant 107 presents an audio difficulties user actuation target 201 upon the display of the conferencing system terminal device 101 while the videoconference is ongoing. In this illustrative embodiment, the one or more processors present the audio difficulties user actuation target 201 on the display of the conferencing system terminal device 101 concurrently with the presentation of conference content 202, which is illustrated in FIG. 3 as including the video feeds of each participant.

As was the case above with FIG. 2, at step 301 participant 107 cannot hear participant 110. Accordingly, participant 107 delivers user input to the conferencing system terminal device 101 by touching the display of the conferencing system terminal device 101 at a location corresponding to the audio difficulties user actuation target 201 to indicate that audio content associated with the videoconference being delivered by the audio output of the conferencing system terminal device 101 is impaired.

The one or more processors of the conferencing system terminal device 101 then detect this actuation of the audio difficulties user actuation target 201. In response to this actuation detection, the one or more processors of the conferencing system terminal device 101 cause the communication device of the conferencing system terminal device 101 to transmit an audio difficulties data communication 205 across the network 105 as previously described. In this illustrative example, the one or more processors of the conferencing system terminal device 101 cause the communication device to transmit the audio difficulties data communication 205 across the network 105 to an audio difficulties monitoring engine operating at an audio or video conferencing system server complex (106).

The one or more processors of the conferencing system terminal device 101 additionally present, at the display of the conferencing system terminal device 101 in response to detecting the actuation of the audio difficulties user actuation target 201, a prompt 207 presenting a plurality of predefined impairments. In this illustrative embodiment, the prompt 207 also requests a selection of at least one predefined impairment from the plurality of predefined impairments. Since participant 107 can't hear participant 210, he checks "no audio at all."

At decision 302, the audio difficulties monitoring engine of the audio or video conferencing system server complex (106) determines a number of audio difficulties data communications (205) that are received from the various participants. Said differently, in one or more embodiments the audio difficulties monitoring engine of the audio or video conferencing system server complex (106) determines, at decision 302, whether one audio difficulties data communication (205) or a plurality of audio difficulties data communications are received across the network 105.

In one or more embodiments, when there is more than one audio difficulties data communication received, the audio difficulties monitoring engine of the audio or video conferencing system server complex (106) determines whether the plurality of audio difficulties data communications exceed a predefined audio difficulty communication threshold. Embodiments of the disclosure contemplate that in audio or video conferences having a sufficient number of participants, it is possible for two, three, four, or even more participants to have audio difficulties that stem from issues with their own conferencing system terminal devices or their connections to the network 105. Accordingly, in one or more embodiments, before concluding that the issue likely is due to the conferencing system terminal device 104 of the presenter, a sufficient number of audio difficulties data communications must be received from a sufficient number of conferencing system terminal devices before suggesting to the presenter that the problem may be due to their conferencing system terminal device 104 or its connection to the network 105. Thus, in one or more embodiments the audio difficulties monitoring engine of the audio or video conferencing system server complex (106) determines whether the plurality of audio difficulties data communications received exceeds a predefined audio difficulty communication threshold.

The predefined audio difficulty communication threshold can vary, and can be set based upon a particular conference's structure. In one or more embodiments, two audio difficulties data communications are all that is required for the presenter to be notified that other participants are experiencing audio difficulties, and that the issue likely resides with that conferencing system terminal device 104 or its connection to the network 105. In other embodiments, a predefined number of audio difficulties data communications must be received, e.g., three, four, five, ten, or more, before the presenter is notified that other participants are experiencing audio difficulties. In still other embodiments, the predefined audio difficulty communication threshold comprises a percentage, such as five percent, ten percent, fifteen percent, twenty percent, or more of the participants before the presenter is notified that other participants are experiencing audio difficulties. These examples of predefined audio difficulty communication thresholds are illustrative only, as others will be obvious to those of ordinary skill in the art having the benefit of this disclosure.

At step 303, the audio difficulties monitoring engine of the audio or video conferencing system server complex (106) cause the communication device of the audio or video conferencing system server complex (106) to transmit an audio difficulties response data communication 206 (which is shown being transmitted in the illustration of step 301). When the plurality of audio difficulties data communications exceeds the predefined audio difficulty communication threshold, the audio difficulties response data communication 206 indicates that operation of a presenter conferencing system terminal device, which is conferencing system terminal device 104 in this example, is causing impairment of audio content associated with the audio or video conference content. This was explained above with reference to FIG. 2.

By contrast, at step 304, when the plurality of audio difficulties data communications fails to exceed the predefined audio difficulty communication threshold, as is the case in FIG. 3, the audio difficulties monitoring engine of the audio or video conferencing system server complex (106) causes the communication device of the audio or video conferencing system server complex (106) to transmit another audio difficulties response data communication 305. In one or more embodiments, this other audio difficulties response data communication 305 indicates that operation of the conferencing system terminal device 101 (or devices) from which the one or more audio difficulties data communications 205 were received is causing impairment of audio content associated with the audio or video conference content.

In this illustrative example, the one or more processors of the conferencing system terminal device 101 present a prompt 307 on the display of the conferencing system terminal device 101 alerting participant 107 that the source of the audio difficulties. The prompt 307 also provides one or more corrective actions that may remediate the impairment of the audio content being delivered by the audio output of the conferencing system terminal device 101. In this example, the corrective action requests that participant 107 "check the Internet." Other proposed corrective actions will be obvious to those of ordinary skill in the art having the benefit of this disclosure. For example, the proposed corrective actions can include rebooting the conferencing system terminal device 101, disconnecting from the videoconference and then re-establishing the connection to the videoconference, turning OFF the video feed to conserve bandwidth, dialing in to the video conference from another device, and so forth.

Figure 4:
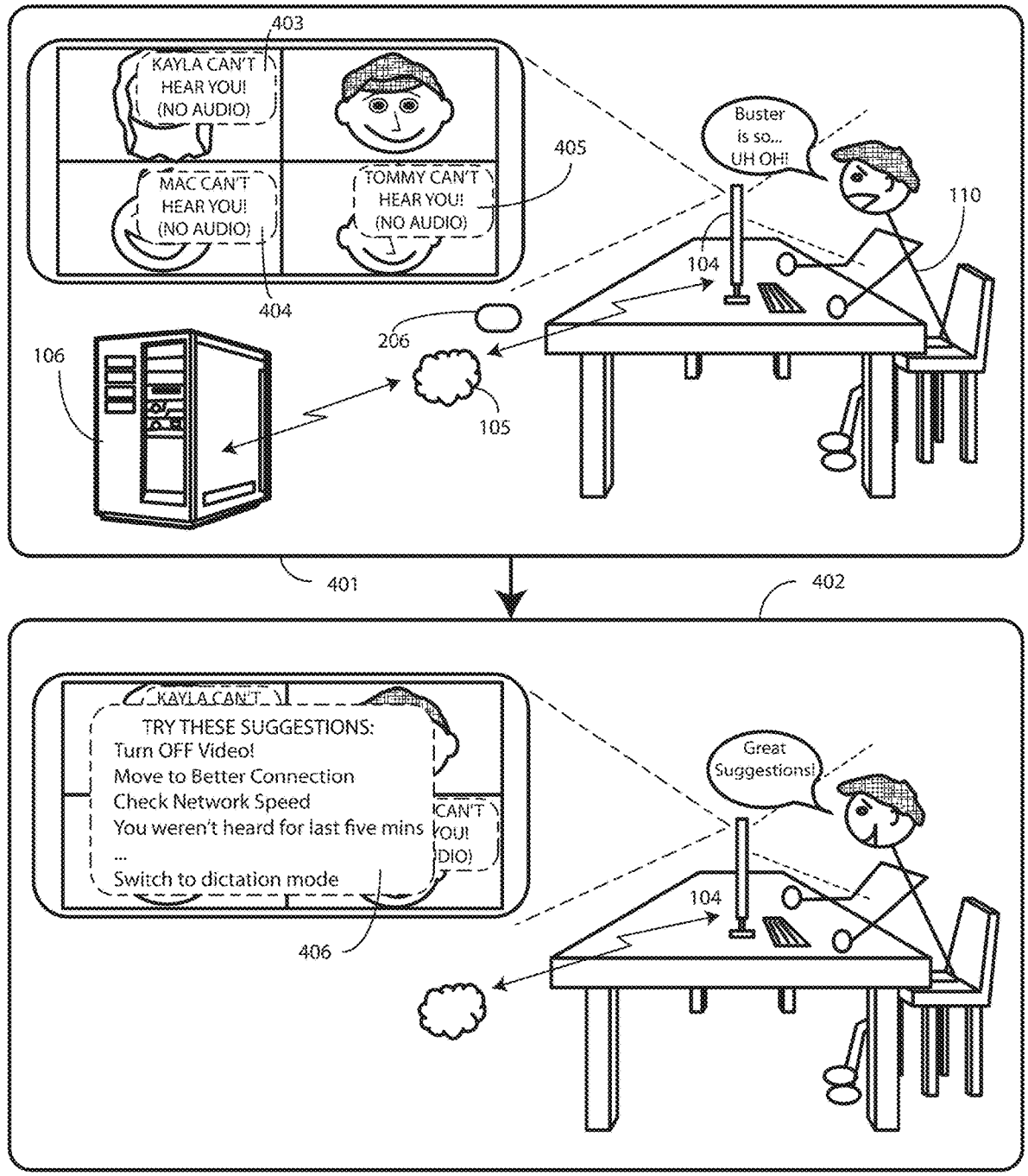
FIG. 4 illustrates one or more explanatory method steps suitable for implementation in one explanatory conferencing system configured in accordance with one or more embodiments of the disclosure.

Turning now to FIG. 4, illustrated therein is a method 400 showing some of these options. Step 401 illustrates the one explanatory result of step (303) from FIG. 3. To wit, at step 301 the communication device of the conferencing system terminal device 104 of the presenter receives an audio difficulties response data communication 206 from the audio difficulties monitoring engine operating at the audio or video conferencing system server complex 106 across the network 105. The audio difficulties response data communication 206 indicates whether the operation of the conferencing system terminal device (101) initially transmitting the audio difficulties data communication (205) or the operation of the presenter conferencing system terminal device, here conferencing system terminal device 104, is causing impairment of the audio content associated with the audio or video conference being delivered by the audio output of the conferencing system terminal device (101) initially transmitting the audio difficulties data communication (205).

In this illustrative example, the plurality of audio difficulties data communications exceeds the predefined audio difficulty communication threshold due to the fact that everyone other than the presenter is unable to hear. Accordingly, the one or more processors of the conferencing system terminal device 104 belonging to the presenter present prompts 403, 404, 405 for each participant who is experiencing audio difficulties. In this example, each prompt 403, 404, 405 is superimposed upon its respective participant experiencing the issue, thereby allowing participant 110 to instantly discern which participants are experiencing issues.

At step 402, the one or more processors of the conferencing system terminal device 104 further present a prompt 406 providing one or more corrective actions that may remediate the impairment of the audio content being delivered by the audio output of the conferencing system terminal devices initially transmitting the audio difficulties data communications. As shown at step 402, in one or more embodiments the prompt 406 proposing one or more corrective actions that may remediate the impairment of the audio content is presented at the display of the conferencing system terminal device 104 in response to the audio difficulties response data communications being transmitted from the other conferencing system terminal devices.

In this example, the proposed corrective actions include turning OFF the video feed to conserve bandwidth, moving to a better connection spot within a Wi-Fi network, checking the network speed to see if the service provider supplying the network connection to conferencing system terminal device 104 is having technical difficulties, and switching to a dictation mode where the voice of participant 110 is translated into text that can be sent to the other participants without audio. Other examples of proposed corrective actions include a request to open a chat window so that participant 110 can chat without audio with the other participants. Still other proposed corrective actions will be obvious to those of ordinary skill in the art having the benefit of this disclosure.

Figure 5:
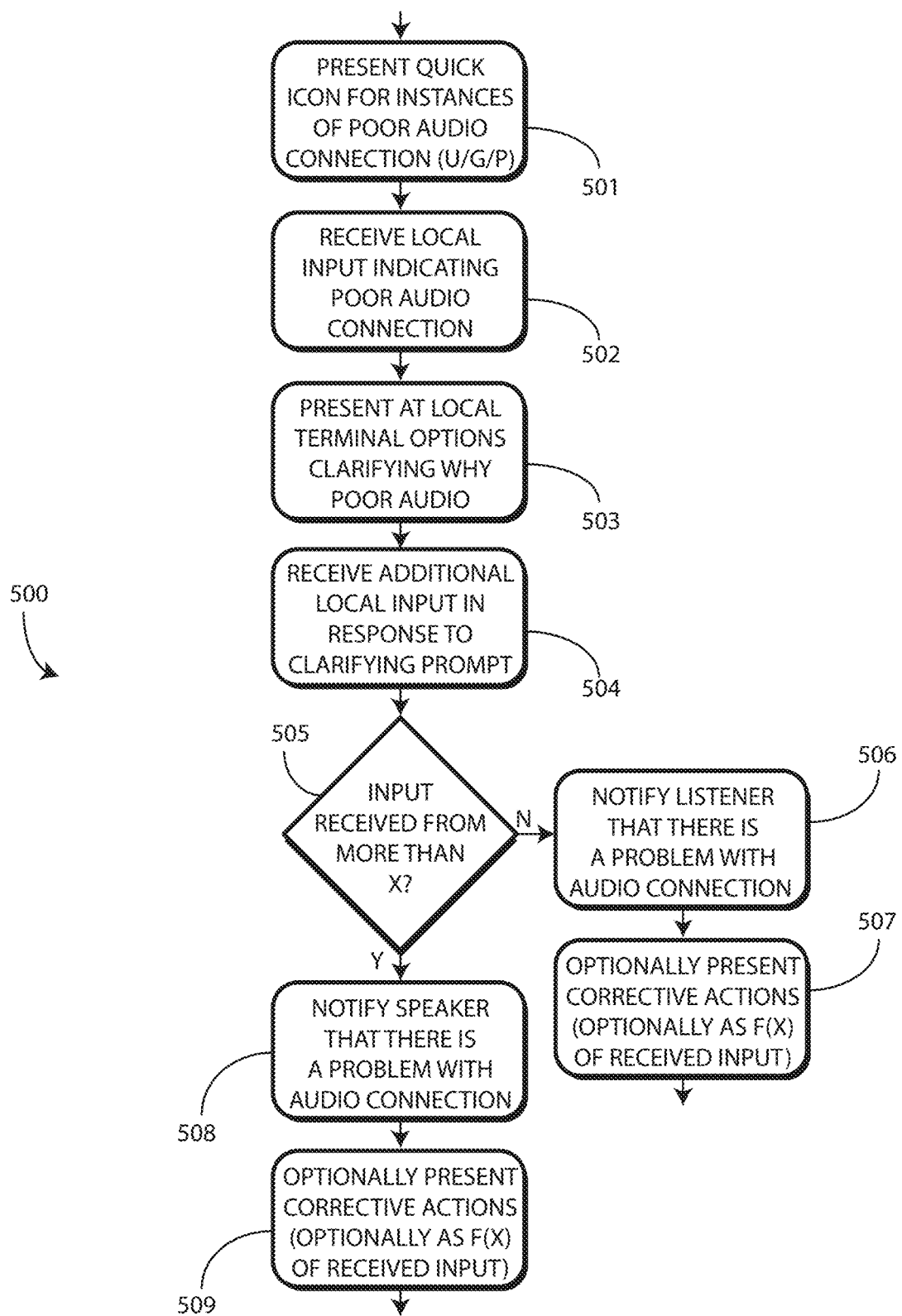
FIG. 5 illustrates one explanatory method in accordance with one or more embodiments of the disclosure.

Turning now to FIG. 5, illustrated therein is a generalized method 500 for addressing audio difficulties in an audio or video conference in accordance with one or more embodiments of the disclosure. Beginning at step 501, one or more processors of a conferencing system terminal device engaged in an audio or video conference present an audio difficulties user actuation target upon the display. In one or more embodiments, step 501 comprises presenting the user actuation target on the display of the conferencing system terminal device during an audio or video conference occurring across a network. In one or more embodiments, step 501 comprises presenting the user actuation target on the display of the conferencing system terminal device concurrently with a presentation of conference content.

Figure 6:
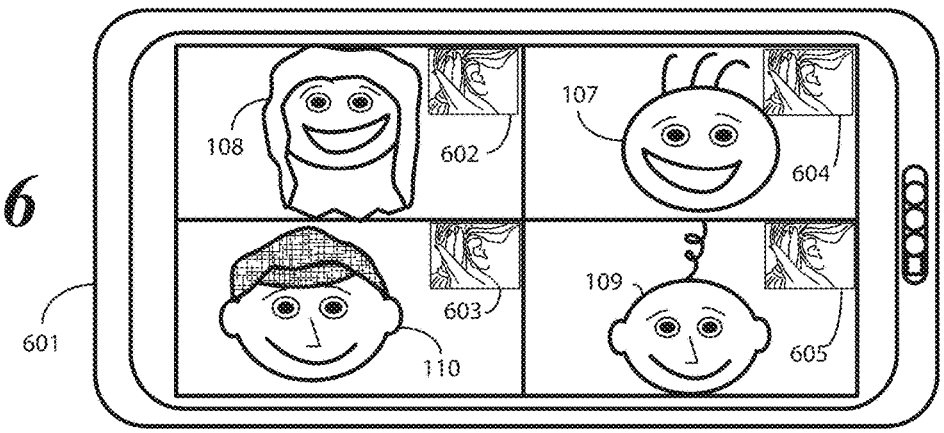
FIG. 6 illustrates one explanatory conferencing system terminal device and user interface operating in a conferencing system in accordance with one or more embodiments of the disclosure.
Figure 7:
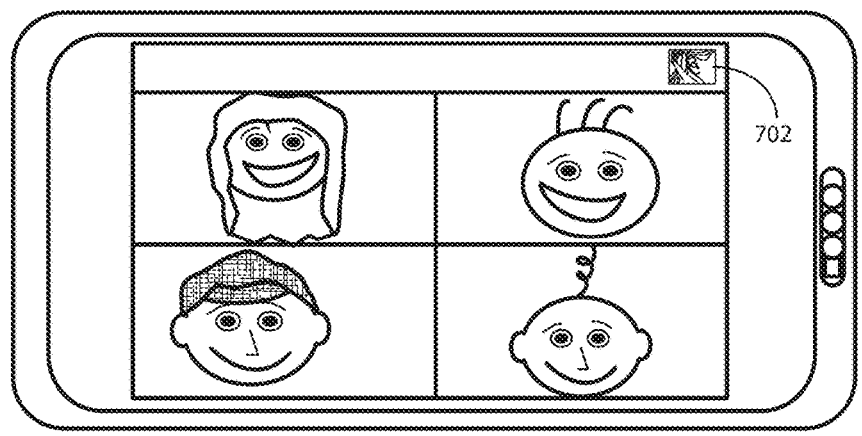
FIG. 7 illustrates another conferencing system terminal device and user interface operating in a conferencing system in accordance with one or more embodiments of the disclosure.
Figure 8:
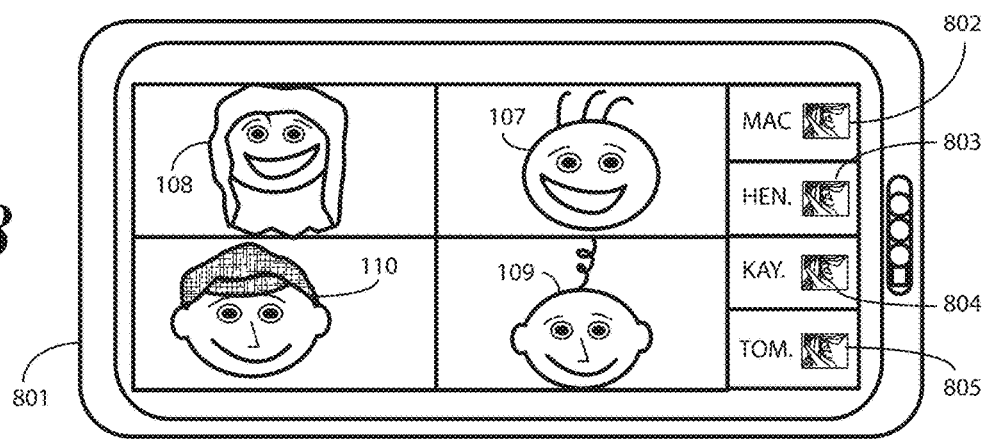
FIG. 8 illustrates yet another explanatory conferencing system terminal device and user interface operating in a conferencing system in accordance with one or more embodiments of the disclosure.

The presentation of the audio difficulties user actuation target at step 501 can occur in a variety of ways. Turning briefly to FIGS. 6-8, illustrated therein are some examples of how this can occur. These examples are illustrative only, as others will be obvious to those of ordinary skill in the art having the benefit of this disclosure.

Beginning with FIG. 6, in this embodiment the one or more processors of the conferencing system terminal device 601 present the audio difficulties user actuation target upon the display by presenting a plurality of audio difficulties user actuation targets upon the display. In this embodiment, each audio difficulties user actuation target 602, 603, 604, 605 of the plurality of audio difficulties user actuation targets corresponds to a participant 108, 110, 107, 109 of the audio or video conference on a one-to-one basis. Accordingly, each participant 107, 108, 109, 110 has associated therewith an audio difficulties user actuation target 602, 603, 604, 605, which allows other participants to actuate an audio difficulties user actuation target 602, 603, 604, 605 for each participant for which they are having audio difficulties. If, for example, participant 107 is having audio difficulties only with participant 110, participant 107 can actuate audio difficulties user actuation target 603 to indicate this fact. By contrast, if participant 107 were having audio difficulties with both participant 109 and participant 110, participant can actuate audio difficulties user actuation target 603 and audio difficulties user actuation target 605, and so forth.

It should be noted that if the conferencing system terminal device 601 belongs to, or is being used by a particular participant, their audio difficulties user actuation target 604 can optionally be omitted, as it is unlikely that they will flag their own audio difficulties to others. In other embodiments, it will be included so that the participant 107 can notify others of known issues affecting their audio when they arise.

Turning now to FIG. 7, to prevent any one participant from having to hit a large number of audio difficulties user actuation targets when widespread issues arise, in another embodiment a global audio difficulties user actuation target 702 can be presented. If a particular participant can hear nothing at all, in one or more embodiments they can simply actuate the global audio difficulties user actuation target 702 to indicate this fact. It should be noted that the global audio difficulties user actuation target 702 can be used in combination with the one-to-one audio difficulties user actuation targets of FIG. 6 in one or more embodiments.

In other embodiments, to simplify the user interface, only the global audio difficulties user actuation target 702 will be presented. Illustrating by example, when the global audio difficulties user actuation target 702 is the only such user actuation target presented, actuation of the global audio difficulties user actuation target 702 identifies the participant currently speaking as the person the actuator of the global audio difficulties user actuation target 702 is having difficulty hearing. Thus, if participant (107) were speaking when participant (108) actuated the global audio difficulties user actuation target 702, in one or more embodiments this indicates that participant (108) cannot hear participant (107). Use of the global audio difficulties user actuation target 702 is also advantageous in situations where participants other than the presenter are muted by default, as actuation of the global audio difficulties user actuation target 702 can indicate that at least one member of the audience is having difficulty hearing the presenter.

Turning now to FIG. 8, illustrated therein is an alternate presentation option for the audio difficulties user actuation targets. As with the embodiment of FIG. 6, in this embodiment the one or more processors of the conferencing system terminal device 801 again present the audio difficulties user actuation target upon the display by presenting a plurality of audio difficulties user actuation targets upon the display. In this embodiment, each audio difficulties user actuation target 802, 803, 804, 805 of the plurality of audio difficulties user actuation targets again corresponds to a participant 107, 108, 109, 110 of the audio or video conference on a one-to-one basis. However, rather than being aligned with the video feed depicting each participant 107, 108, 109, 110 as illustrated in FIG. 6, in FIG. 8 each audio difficulties user actuation target 802, 803, 804, 805 is presented in a list. In this illustrative embodiment, each audio difficulties user actuation target 802, 803, 804, 805 is presented in a list adjacent to a name of each participant 107, 108, 109, 110. This arrangement prevents each audio difficulties user actuation target 802, 803, 804, 805 from obscuring the video feeds of each participant 107, 108, 109, 110. As with the embodiment of FIG. 6, the embodiment of FIG. 8 can be used alone or in conjunction with the global audio difficulties user actuation target (702).

Turning now back to FIG. 5, at step 502 the one or more processors of a conferencing system terminal device detect actuation of an audio difficulties user actuation target from the user interface of the conferencing system terminal device. In one or more embodiments, step 502 comprises the one or more processors of the conferencing system terminal device causing a communication device of the conferencing system terminal device to transmit an audio difficulties data communication across a network to one or more processors operating at an audio or video conferencing system server complex. In one or more embodiments, the one or more processors operating at the audio or video conferencing system server complex are configured to implement an audio difficulties monitoring engine.

At step 503, the one or more processors of the conferencing system terminal device present, at the display of the conferencing system terminal device, an audio difficulties prompt requesting an identification of an audio impairment type occurring at the audio output. In one or more embodiments, the audio difficulties prompt requests a confirmation that the audio content associated with the audio or video conference being delivered by the audio output is impaired.

In one or more embodiments, the audio difficulties prompt presented at step 503 presents a plurality of predefined impairments. In one or more embodiments, the prompt request a selection of at least one predefined impairment from the plurality of predefined impairments. At step 504, the one or more processors of the conferencing system terminal device receive a selection of at least one predefined impairment from the plurality of predefined impairments. In one or more embodiments, step 504 also includes the one or more processors of the conferencing system terminal device causing a communication device of the conferencing system terminal device to transmit, in response to the selection, an impairment identification message to one or more processors, optionally implementing an audio difficulties monitoring engine, and operating at an audio or video conferencing system server complex.

At decision 505, the one or more processors of the audio or video conferencing system server complex determine whether a number of received audio difficulties data communications comprises a plurality of audio difficulties data communications, and whether that plurality of audio difficulties data communications exceeds a predefined audio difficulty communication threshold. In one or more embodiments, the predefined audio difficulty communication threshold comprises a predefined percentage of the conferencing system terminal devices engaging in the audio or video conference.

At step 506, when the plurality of audio difficulties data communications fails to exceed the predefined audio difficulty communication threshold, the one or more processors of the audio or video conferencing system server complex cause the communication device to transmit an audio difficulties response data communication indicating that operation of the one or more conferencing system terminal devices from which the one or more audio difficulties data communications are received is causing impairment of audio content associated with the audio or video conference content. At step 507, the one or more processors of the conferencing system terminal device may optionally present one or more corrective actions that may remediate the impairment of the audio content being delivered by the audio output.

At step 508, when the plurality of audio difficulties data communications exceeds the predefined audio difficulty communication threshold, the one or more processors of the audio or video conferencing system server complex cause the communication device to transmit an audio difficulties response data communication indicating that operation of a presenter conferencing system terminal device is causing impairment of audio content associated with the audio or video conference content. At step 509, the one or more processors of the conferencing system terminal device may optionally present one or more corrective actions that may remediate the impairment of the audio content being delivered by the audio output.

Figure 9:
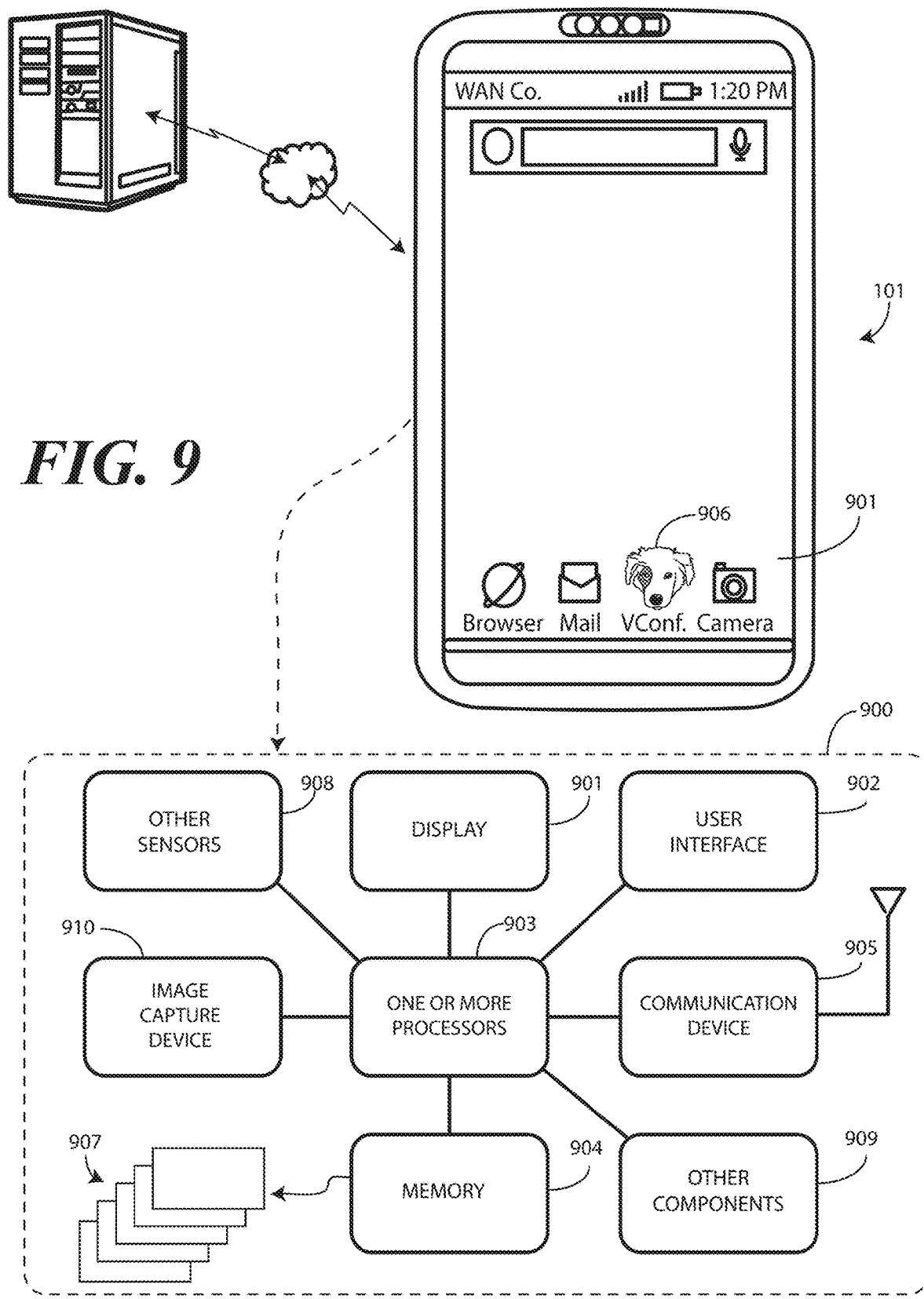
FIG. 9 illustrates one explanatory conferencing system terminal device in accordance with one or more embodiments of the disclosure.

Turning now to FIG. 9, illustrated therein is one explanatory conferencing system terminal device 101. The conferencing system terminal device 101 of FIG. 9 is a portable electronic device. For illustrative purposes, the conferencing system terminal device 101 is shown as a smartphone. However, the conferencing system terminal device 101 could be any number of other devices as well, including tablet computers, desktop computers, notebook computers, and so forth. Still other types of conferencing system terminal devices can be configured in accordance with one or more embodiments of the disclosure as will be readily appreciated by those of ordinary skill in the art having the benefit of this disclosure.

This illustrative conferencing system terminal device 101 includes a display 901, which may optionally be touch-sensitive. In one embodiment where the display 901 is touch-sensitive, the display 901 can serve as a primary user interface 902 of the conferencing system terminal device 101. Users can deliver user input to the display 901 of such an embodiment by delivering touch input from a finger, stylus, or other objects disposed proximately with the display 901. In one embodiment, the display 901 is configured as an active matrix organic light emitting diode (AMOLED) display. However, it should be noted that other types of displays, including liquid crystal displays, would be obvious to those of ordinary skill in the art having the benefit of this disclosure. Where the conferencing system terminal device 101 is configured with a keyboard and/or mouse, such as when the conferencing system terminal device 101 is configured as a computer, the keyboard and/or mouse can serve as the primary user interface 902.

A block diagram schematic 900 of the conferencing system terminal device 101 is also shown in FIG. 9. The block diagram schematic 900 can be configured as a printed circuit board assembly disposed within the device housing of the conferencing system terminal device 101. Various components can be electrically coupled together by conductors or a bus disposed along one or more printed circuit boards.

In one or more embodiments, the conferencing system terminal device 101 includes one or more processors 903. In one embodiment, the one or more processors 903 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the conferencing system terminal device 101. Each of the application processor and the auxiliary processor(s) can be configured to process and execute executable software code to perform the various functions of the conferencing system terminal device 101. A storage device, such as memory 904, can optionally store the executable software code used by the one or more processors 903 during operation.

The conferencing system terminal device 101 also includes a communication device 905 that can be configured for wired or wireless communication with one or more other devices or networks. The networks can include a wide area network, a local area network, and/or personal area network. The communication device 905 may also utilize wireless technology for communication, such as, but are not limited to, peer-to-peer or ad hoc communications such as HomeRF, Bluetooth and IEEE 802.11, and other forms of wireless communication such as infrared technology. The communication device 905 can include wireless communication circuitry, one of a receiver, a transmitter, or transceiver, and one or more antennas.

In one embodiment, the one or more processors 903 can be responsible for performing the primary functions of the conferencing system terminal device 101. For example, in one embodiment the one or more processors 903 comprise one or more circuits operable with one or more user interface devices, which can include the display 901, to engage in audio or video conferences by transmitting, receiving, and presenting images, video, or other presentation information. The executable software code used by the one or more processors 903, including that associated with an audio or video conference application 906, can be configured as one or more modules 907 that are operable with the one or more processors 903. Such modules 907 can store instructions, control algorithms, logic steps, and so forth.

In one embodiment, the one or more processors 903 are responsible for running the operating system environment of the conferencing system terminal device 101. The operating system environment can include a kernel and one or more drivers, and an application service layer, and an application layer. The operating system environment can be configured as executable code operating on one or more processors or control circuits of the conferencing system terminal device 101. The application layer can be responsible for executing application service modules. The application service modules may support one or more applications or "apps," such as the video conference application 906. The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 903 may generate commands or execute control operations based upon user input received at the user interface 902. Moreover, the one or more processors 903 may process the received information alone or in combination with other data, such as the information stored in the memory 904.

The conferencing system terminal device 101 can include one or more sensors 908. The one or more sensors 908 may include a microphone, an earpiece speaker, and/or a second loudspeaker. The one or more other sensors 908 may also include touch actuator selection sensors, proximity sensors, a touch pad sensor, a touch screen sensor, a capacitive touch sensor, and one or more switches. Touch sensors may used to indicate whether any of the user actuation targets present on the display 901, including the audio difficulties user actuation targets described above, are being actuated. The other sensors 908 can also include audio sensors and video sensors (such as a camera).

Other components 909 operable with the one or more processors 903 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

The other components 909 can also include an audio input/processor. The audio input/processor can include hardware, executable code, and speech monitor executable code in one embodiment. The audio input/processor can include, stored in memory 904, basic speech models, trained speech models, or other modules that are used by the audio input/processor to receive and identify voice commands that are received with audio input captured by an audio input/processor, one example of which is a microphone of the one or more sensors 908. In one embodiment, the audio input/processor can include a voice recognition engine. Regardless of the specific implementation utilized in the various embodiments, the audio input/processor can access various speech models to identify speech commands in one or more embodiments.

To capture video during a video conference, in one or more embodiments the conferencing system terminal device 101 includes an imager 910. The conferencing system terminal device 101 can optionally include a depth imager as well.

In one embodiment, the imager 910 comprises a two-dimensional imager configured to receive at least one image of a person within an environment of the conferencing system terminal device 101. In one embodiment, the imager 910 comprises a two-dimensional RGB imager. In another embodiment, the imager 910 comprises an infrared imager. Other types of imagers suitable for use as the imager 910 of the authentication system will be obvious to those of ordinary skill in the art having the benefit of this disclosure.

It is to be understood that FIG. 9 is provided for illustrative purposes only and for illustrating components of one conferencing system terminal device 101 in accordance with embodiments of the disclosure and is not intended to be a complete schematic diagram of the various components required for an electronic device. Therefore, other conferencing system terminal devices in accordance with embodiments of the disclosure may include various other components not shown in FIG. 9 or may include a combination of two or more components or a division of a particular component into two or more separate components, and still be within the scope of the present disclosure.

Figure 10:
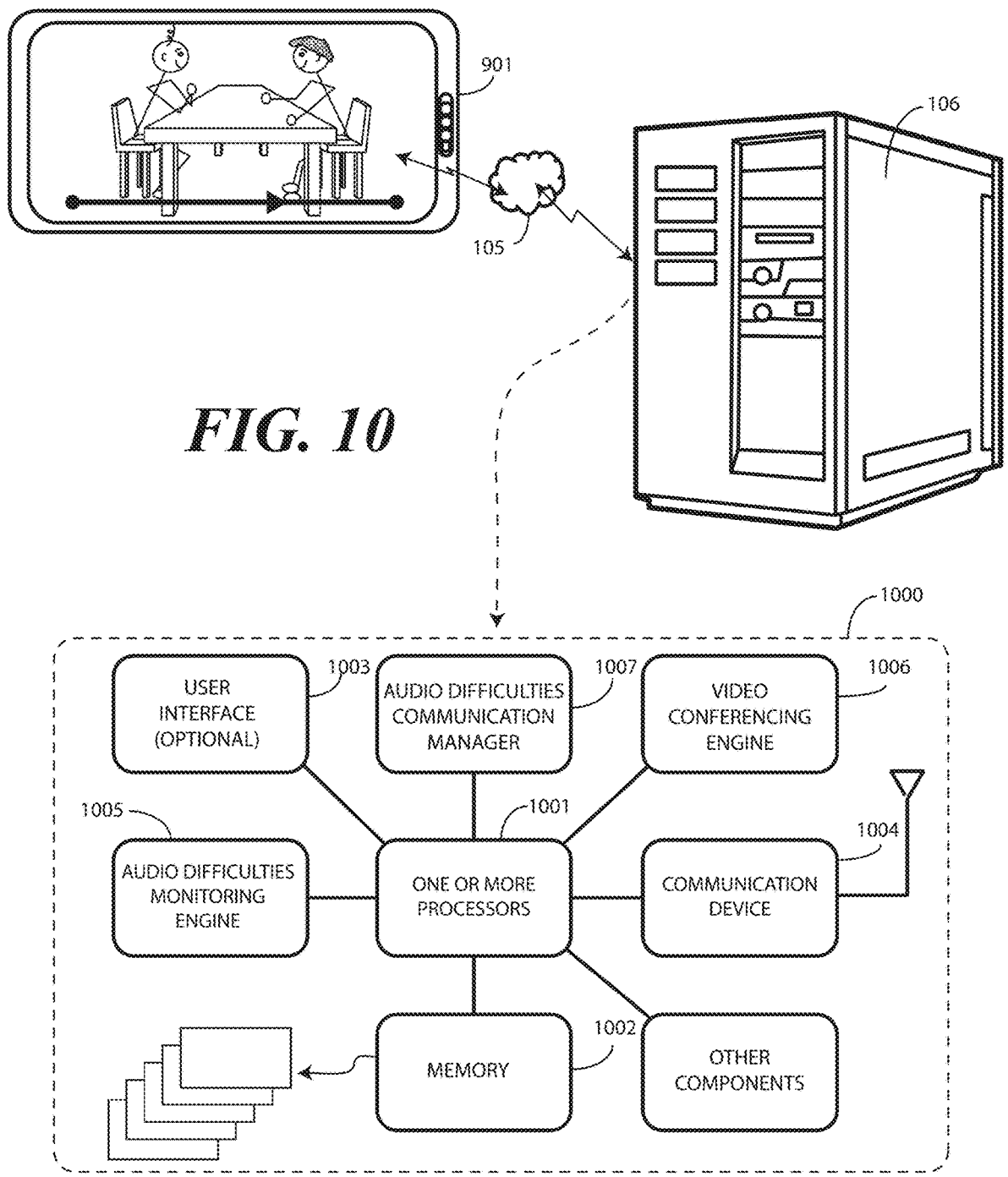
FIG. 10 illustrates one explanatory audio or video conferencing system server complex in accordance with one or more embodiments of the disclosure.

Turning now to FIG. 10, illustrated therein is one explanatory audio or video conferencing system server complex 106 configured in accordance with one or more embodiments of the disclosure. An illustrative schematic block diagram 1000 is also shown in FIG. 10.

As with the block diagram schematic (900) of FIG. 9, it is to be understood that the schematic block diagram 1000 of FIG. 10 is provided for illustrative purposes only and for illustrating components of one explanatory server complex 106 configured in accordance with one or more embodiments of the disclosure. Accordingly, the components shown in either FIG. 9 or FIG. 10 are not intended to be complete schematic diagrams of the various components required for a particular device, as other devices configured in accordance with embodiments of the disclosure may include various other components not shown in FIG. 9 or FIG. 10. Alternatively, other server complexes or conferencing system terminal devices configured in accordance with embodiments of the disclosure or may include a combination of two or more components or a division of a particular component into two or more separate components, and still be within the scope of the present disclosure.

In one or more embodiments the server complex 106 can be configured with performing processor-intensive methods, operations, steps, functions, or procedures associated with the presentation, actuation, and management of audio difficulties user actuation targets during an audio or video conference. Illustrating by example, the server complex 106 can be configured to receive one or more audio difficulties data communications across a network 105 from one or more conferencing system terminal devices, e.g., conferencing system terminal device 101, while the server complex 106 delivers audio or video conference content to the various conferencing system terminal devices.

In one or more embodiments, the server complex 106 includes one or more processors 1001, one or more memory devices 1002, and one or more user interface devices 1003, e.g., a display, a keyboard, a mouse, audio input devices, audio output devices, and alternate visual output devices. The server complex 106 also includes a communication device 1004. These components can be operatively coupled together such that, for example, the one or more processors 1001 are operable with the one or more memory devices 1002, the one or more user interface devices 1003, and/or the communication device 1004 in one or more embodiments.

The one or more processors 1001 can include a microprocessor, a group of processing components, one or more ASICs, programmable logic, or other type of processing device. The one or more processors 1001 can be configured to process and execute executable software code to perform the various functions of the server complex 106.

The one or more memory devices 1002 can optionally store the executable software code used by the one or more processors 1001 in carrying out the operations of the audio or video conference system. The one or more memory devices 1002 may include either or both of static and dynamic memory components. The one or more memory devices 1002 can store both embedded software code and user data.

In one or more embodiments, the one or more processors 1001 can define one or more process engines. For instance, the software code stored within the one or more memory devices 1002 can embody program instructions and methods to operate the various functions of the server complex 106, and also to execute software or firmware applications and modules such as a audio difficulties monitoring engine 1005, and audio difficulties communication manager 1007, and an audio or video conferencing engine 1006.

Such process engines can be a component of the one or more processors 1001, operable with the one or more processors 1001, defined by the one or more processors 1001, and/or integrated into the one or more processors 1001. Other configurations for these engines, including as software or firmware modules operable on the one or more processors 1001, will be obvious to those of ordinary skill in the art having the benefit of this disclosure.

Where included, the process engines can be configured to perform audio difficulties management operations. Illustrating by example, in one or more embodiments the audio difficulties communication manager 1007, operating in conjunction with the communication device 1004, receives one or more audio difficulties data communications across the network 105 from one or more conferencing system terminal devices, e.g., conferencing system terminal device 101. In one or more embodiments, the audio difficulties communication manager 1007 receives these audio difficulties data communications while the audio or video conferencing engine 1006 delivers audio or video conference content to the various conferencing system terminal devices engaged in the audio or video conference.

The audio difficulties monitoring engine 1005 can determine whether the one or more audio difficulties data communications received by the audio difficulties communication manager 1007 comprise a plurality of audio difficulties data communications exceeding a predefined audio difficulties communication threshold, which may be defined as a predefined percentage of the plurality of conferencing system terminal devices engaged in any one particular audio or video conference.

In one or more embodiments, the audio difficulties monitoring engine 1005 can cause the communication device 1004 to transmit an audio difficulties response data communication indicating that operation of the one or more conferencing system terminal devices from which the one or more audio difficulties data communications are received is causing impairment of audio content associated with the audio or video conference content when the plurality of audio difficulties data communications fails to exceed the predefined audio difficulty communication threshold. Alternatively, the audio difficulties monitoring engine 1005 can cause the communication device 1004 to transmit an audio difficulties response data communication indicating that operation of a presenter conferencing system terminal device is causing impairment of audio content associated with the audio or video conference content when the plurality of audio difficulties data communications exceeds the predefined audio difficulty communication threshold.

When managing the various audio difficulties data communications and the determination of whether the number of audio difficulties data communications received exceeds a predefined threshold, be it a predefined percentage of the number of conferencing system terminal devices engaged in the audio or video conference, a fixed number of conferencing system terminal devices, or other metric, the audio difficulties monitoring engine 1005, and thus the server complex 106, plays an active role in determining where the likely source of the audio difficulties is occurring in the system. For example, when concluding that the presenter conferencing system terminal device is the source of the problem, the audio difficulties monitoring engine 1005 can cause the communication device 1004 to transmit an audio difficulties response data communication to the various conferencing system terminal devices indicating that operation of the presenter conferencing system terminal device is causing the impairment of the audio content associated with the audio or video conference.

Figure 11:
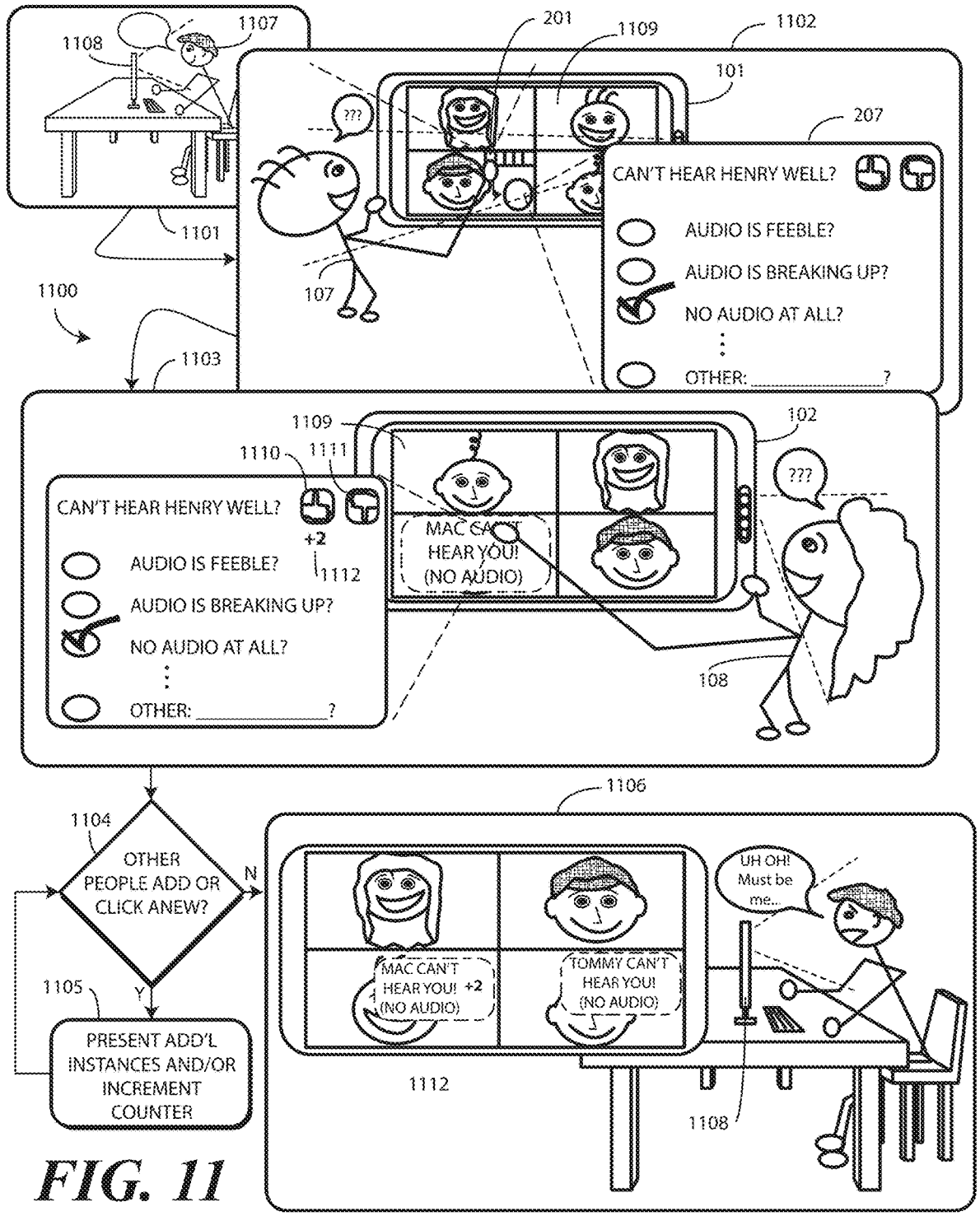
FIG. 11 illustrates one or more explanatory method steps suitable for implementation in one explanatory conferencing system configured in accordance with one or more embodiments of the disclosure.

Embodiments of the disclosure contemplate that in other embodiments, this level of "intelligence" is not required in the server complex 106. Instead, the server complex 106 can simply be a relay for the audio difficulties data communications between the various conferencing system terminal devices engaged in a particular audio or video conference, as well as a relay of the audio or video conference content itself via the audio or video conferencing engine 1006.

Where so configured, the server complex 106 still makes it possible for the participants to determine the likely cause of the audio difficulties. Turning now to FIG. 11, illustrated therein is one explanatory method 1100 demonstrating how this can occur.

Beginning at step 1101, a presenter 1107 is using a presenter conferencing system terminal device 1108 to deliver videoconference content, which includes audio, to other conferencing system terminal devices engaged in the videoconference. However, in this illustration there is a problem with the audio content being received by the other conferencing system terminal devices.

At step 1102, one or more processors of another conferencing system terminal device 101 being used by participant 107 presents an audio difficulties user actuation target 201 upon the display of the conferencing system terminal device 101 while the videoconference is ongoing. In this illustrative embodiment, the one or more processors present the audio difficulties user actuation target 201 on the display of the conferencing system terminal device 101 concurrently with the presentation of videoconference content 1109, which includes the video feeds of each participant and corresponding audio content.

Since participant 107 cannot hear the presenter 1107, he delivers user input to the conferencing system terminal device 101 by touching the display of the conferencing system terminal device 101 at a location corresponding to the audio difficulties user actuation target 201. The one or more processors of the conferencing system terminal device 101, in response to this actuation, present an audio difficulties prompt 207 requesting an identification of an audio impairment type occurring at the audio output of the conferencing system terminal device 101. The audio difficulties prompt 207 presents a plurality of predefined impairments and requests a selection of at least one predefined impairment from the plurality of predefined impairments. Since participant 107 cannot hear the presenter 1107, he selects "no audio at all," thereby indicating that audio content associated with the videoconference being delivered by the audio output of the conferencing system terminal device 101 is impaired.

The one or more processors of the conferencing system terminal device 101 then detect this actuation within this prompt. In response to this actuation detection, the one or more processors of the conferencing system terminal device 101 cause the communication device of the conferencing system terminal device 101 to transmit an audio difficulties data communication (205) across the network (105) to the server complex (106), which acts only as a relay in this example.

At step 1103, another conferencing system terminal device 102 being used by another participant 108 receives this audio difficulties data communication (205) across the network (105) from conferencing system terminal device 101, which defines at least a portion of the plurality of conferencing system terminal devices engaged in the videoconference. In one or more embodiments, this receipt by conferencing system terminal device 102 occurs while the audio or video conferencing engine (1006) of the server complex (106) delivers the videoconference content 1109 to the various conferencing system terminal devices 101, 102 engaged in the videoconference.

In response to this receipt, the one or more processors of conferencing system terminal device 102 present the prompt 207 initially presented at conferencing system terminal device 101 at step 1102. This provides participant 108 the ability to affirm the problem by actuating a "like" user actuation target 1110. Had participant 108 not been experiencing the issue, she could have actuated a "dislike" user actuation target 1111. The ability to simply actuate a "like" user actuation target 1110 saves participant 108 the trouble of having to actuate the audio difficulties user actuation target presented at her device and then navigate through a prompt 207 initially presented at her display.

In one or more embodiments, when participant 108 confirms the problem, the one or more processors of the conferencing system terminal device 102 present an incrementation 1112 at the prompt 207. This incrementation then gets incorporated into an audio difficulties data communication transmitted from conferencing system terminal device 102 to the other conferencing system terminal devices, and further indicates how many conferencing system terminal devices are in the portion of the plurality of conferencing system terminal devices engaged in the videoconference who are experiencing this problem.

At step 1103, the number is two. However, as shown at decision 1104 and step 1105, this liking process and/or separate transmission of audio difficulties data communications in response to separate actuations of the audio difficulties user actuation target can continue while people experience the problem. The server complex (106) can then transmit the number of audio difficulties response data communications necessary to indicate how many conferencing system terminal devices are experiencing the problem. As shown at step 1106, these audio difficulties response data communications received by the presenter conferencing system terminal device 1108 cause the presentation of an incrementation 1112 indicating how many confirmations of the one or more audio difficulties response data communications are received. They also indicate how many conferencing system terminal devices are experiencing the problem. In this example, there are three people experiencing the problem, as participant 107 actuated his audio difficulties user actuation target 201 with participant 108 confirming the problem. Meanwhile, another participant has independently actuated the audio difficulties user actuation target as well.

Thus, in the method 1100 of FIG. 11, if a particular participant has an audio problem with others unable to hear him, a first participant can indicate the same by actuating an audio difficulties user actuation target. A notification of the problem gets delivered to other conferencing system terminal devices via the audio difficulties data communication and audio difficulties response data communication process.

Accordingly, other participants can see the first indication of the problem at their conferencing system terminal devices.

Other participants can then click like user actuation targets to cause an incrementation to occur as a result of these confirmations. When this occurs, the other participants then see the incrementation via the audio difficulties data communication and audio difficulties response data communication process utilizing the server complex as a relay.

In this manner, the greater number indicated by the incrementation the more likely the problem lies with the presenter conferencing system terminal device 1108. The presenter 1107 can then start working on his presenter conferencing system terminal device 1108—or its connection to the network (105) to fix the issue. Thus, rather than the audio difficulties monitoring engine (1005) of the server complex (106) making active determinations as in other embodiments, here the incrementation 1112 and the number of actuations of the audio difficulties user actuation target 201 are indicators as to where the problem lies. Accordingly, the server complex (106) can take active roles in making this determination in some embodiments, but can simply serve as a relay and audio or video conference streaming link in other embodiments. Other configurations will be obvious to those of ordinary skill in the art having the benefit of this disclosure.

How the server complex (106) is configured can be assessed contexts and frameworks using adjustable algorithms of context assessment employing information, data, and events. These assessments may be learned through repetitive data analysis. Alternatively, a user may employ the user interface devices (1003) of the server complex (106) to enter various parameters, constructs, rules, and/or paradigms that instruct or otherwise guide the process engines in detecting contextual information. The process engines can comprise an artificial neural network or other similar technology in one or more embodiments.

Figure 12:
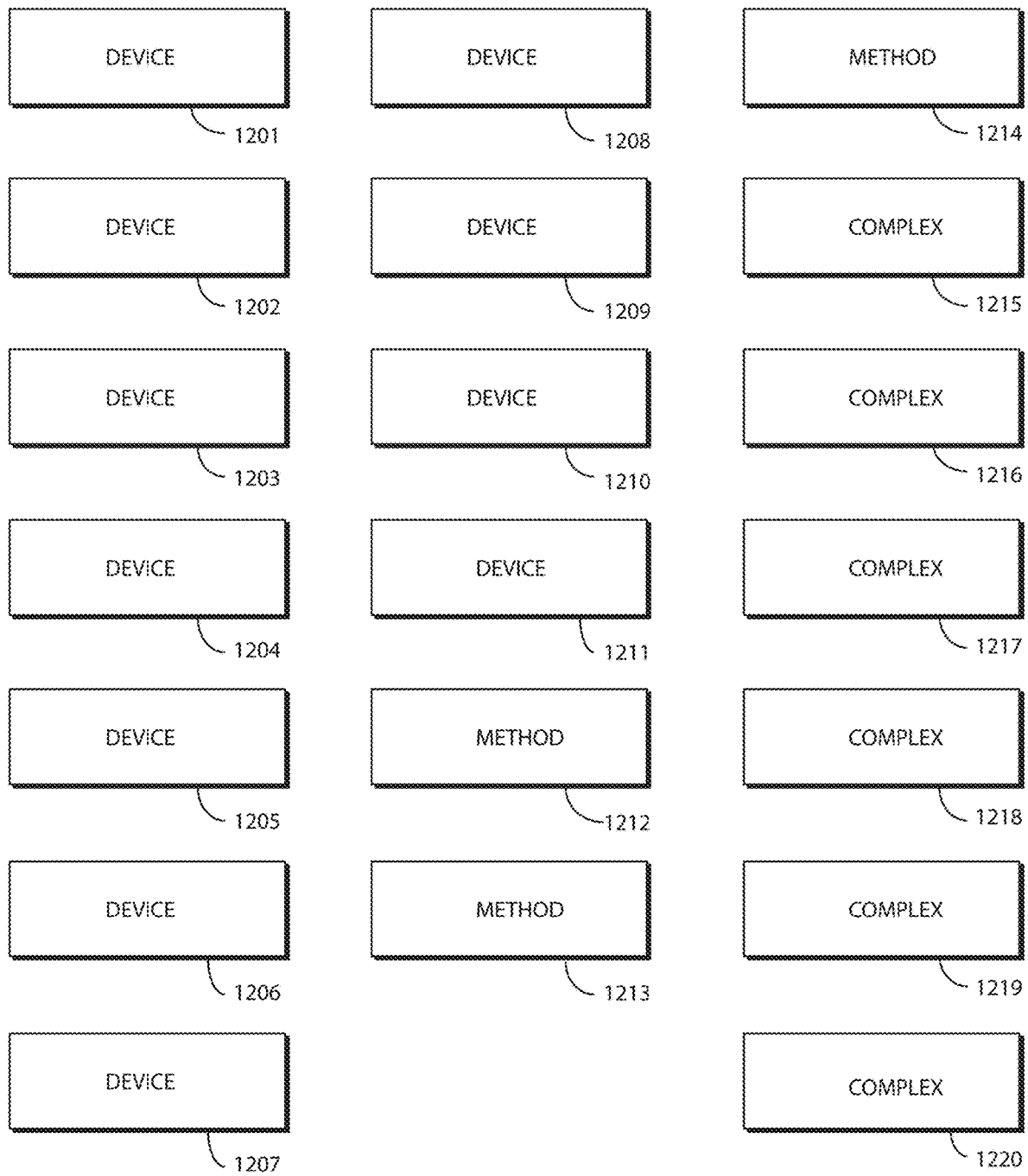
FIG. 12 illustrates various embodiments of the disclosure.

Turning now to FIG. 12, illustrated therein are various embodiments of the disclosure. The embodiments of FIG. 12 are shown as labeled boxes in FIG. 12 due to the fact that the individual components of these embodiments have been illustrated in detail in FIGS. 1-11, which precede FIG. 12. Accordingly, since these items have previously been illustrated and described, their repeated illustration is no longer essential for a proper understanding of these embodiments. Thus, the embodiments are shown as labeled boxes.

At 1201, a conferencing system terminal device comprises a display, an audio output, a user interface, a communication device, and one or more processors. At 1201, the one or more processors present an audio difficulties user actuation target upon the display during an audio or video conference occurring across a network and concurrently with a presentation of conference content. At 1202, the actuation of the audio difficulties user actuation target of 1201 indicates that audio content associated with the audio or video conference being delivered by the audio output is impaired.

At 1203, one or more processors of 12202 detect actuation of the audio difficulties user actuation target from the user interface. At 1203, the one or more processors cause the communication device to transmit an audio difficulties data communication across a network to an audio difficulties monitoring engine operating at an audio or video conferencing system server complex.

At 1204, the one or more processors of 1203 further receive, with the communication device from the audio difficulties monitoring engine of the audio or video conferencing system server complex, an audio difficulties response data communication. At 1204, the audio difficulties response data communication indicates that operation of the conferencing system terminal device is causing impairment of the audio content being delivered by the audio output.

At 1205, the one or more processors of 1204 further present at the display in response to the audio difficulties response data communication, a prompt. At 1205, the prompt provides one or more corrective actions that may remediate the impairment of the audio content being delivered by the audio output.

At 1206, the one or more processors of 1202 detect actuation of the audio difficulties user actuation target from the user interface. At 1206, the one or more processors present, at the display of the conferencing system terminal device, an audio difficulties prompt requesting an identification of an audio impairment type occurring at the audio output.

At 1207, the audio difficulties prompt of 1206 requests a confirmation that the audio content associated with the audio or video conference being delivered by the audio output is impaired. AT 1208, the audio difficulties prompt of 1206 presents a plurality of predefined impairments and requesting a selection of at least one predefined impairment from the plurality of predefined impairments.

At 1209, the one or more processors of 1208 receive a selection of at least one predefined impairment. At 1209, the one or more processors cause a communication device to transmit, in response to the selection, an impairment identification message to an audio difficulties monitoring engine operating at an audio or video conferencing system server complex.

At 1210, the one or more processors of 1201 present the audio difficulties user actuation target upon the display by presenting a plurality of audio difficulties user actuation targets upon the display. At 1201, each audio difficulties user actuation target of the plurality of audio difficulties user actuation targets corresponds to a participant of the audio or video conference on a one-to-one basis. At 1211, the audio difficulties user actuation target of 1201 comprises an icon depicting a hand by an ear.

At 1212, a method in a conferencing system comprises detecting, by one or more processors of a conferencing system terminal device, actuation of an audio difficulties user actuation target during an audio or video conference. At 121, the method comprises transmitting, with a communication device operable with the one or more processors, an audio difficulties data communication across a network to an audio difficulties monitoring engine operating at an audio or video conferencing system server complex.

At 1213, the method of 1212 further comprises receiving, with the communication device, an audio difficulties response data communication from the audio difficulties monitoring engine operating at the audio or video conferencing system server complex. At 1213, the audio difficulties response data communication indicates whether operation of the conferencing system terminal device or operation of a presenter conferencing system terminal device is causing impairment of audio content associated with the audio or video conference being delivered by an audio output of the conferencing system terminal device.

At 1214, the method of 1212 further comprises presenting, at a display of the conferencing system terminal device in response to the detecting the actuation of the audio difficulties user actuation target, a prompt. At 1214, the prompt presents a plurality of predefined impairments and requesting a selection of at least one predefined impairment from the plurality of predefined impairments.

At 1215, a conferencing system server complex comprises an audio or video conferencing engine delivering audio or video conferencing content to a plurality of conferencing system terminal devices. At 1215, the server complex comprises an audio difficulties monitoring engine. At 1215, the server complex comprises a communication device and one or more processors. At 1215, the one or more processors receive one or more audio difficulties data communications across a network from one or more conferencing system terminal devices while the audio or video conferencing engine delivers audio or video conference content to the plurality of conferencing system terminal devices.

At 1216, the one or more processors of 1215 determine whether the one or more audio difficulties data communications comprise a plurality of audio difficulties data communications exceeding a predefined audio difficulty communication threshold. At 1216, the one or more processors cause the communication device to transmit an audio difficulties response data communication indicating that operation of the one or more conferencing system terminal devices from which the one or more audio difficulties data communications are received is causing impairment of audio content associated with the audio or video conference content when the plurality of audio difficulties data communications fails to exceed the predefined audio difficulty communication threshold. Alternatively, at 1216 the one or more processors cause the communication device to transmit an audio difficulties response data communication indicating that operation of a presenter conferencing system terminal device is causing impairment of audio content associated with the audio or video conference content when the plurality of audio difficulties data communications exceeds the predefined audio difficulty communication threshold.

At 1217, the predefined audio difficulty communication threshold of 1216 comprises a predefined percentage of the plurality of conferencing system terminal devices.

At 1218, the one or more processors of 1217 cause the communication device to transmit another audio difficulties response data communication to the one or more conferencing system terminal devices. At 1218, the other audio difficulties response data communication indicates that operation of the presenter conferencing system terminal device is causing the impairment of audio content associated with the audio or video conference content.

At 1219, the one or more processors of 1215 receive a plurality of audio difficulties data communications across the network from at least a portion of the plurality of conferencing system terminal devices while the audio or video conferencing engine delivers the audio or video conference content to the plurality of conferencing system terminal devices. At 1219, the one or more processors cause the communication device to transmit a plurality of audio difficulties response data communications to the plurality of conferencing system terminal devices indicating how many conferencing system terminal devices are in the at least a portion of the plurality of conferencing system terminal devices.

At 1220, the one or more processors of 1215 receive one or more confirmations of the one or more audio difficulties data communications across the network from one or more additional conferencing system terminal devices while the audio or video conferencing engine delivers the audio or video conference content to the plurality of conferencing system terminal devices. At 1220, the one or more processors cause the communication device to present an incrementation in the audio difficulties response data communication indicating how many confirmations of the one or more audio difficulties data response communications are received.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A conferencing system terminal device, comprising:
a display;
an audio output;
a user interface;
a communication device; and
one or more processors;
the one or more processors presenting a plurality of audio difficulties user actuation targets upon the display during a video conference occurring across a network and concurrently with a presentation of conference content without overlapping or obscuring video feeds of each participant of the video conference, and with the plurality of audio difficulties user actuation targets arranged in a list with an icon presented adjacent to a name of the each participant on a one-to-one basis.

2. The conferencing system terminal device of claim 1, where at least one icon comprises a hand depiction in the icon and an ear depiction in the icon with the hand depiction of the icon positioned by the ear depiction of the icon.

3. The conferencing system terminal device of claim 2, the icon depicting a plurality of fingers of the hand depiction positioned by the helix of the ear depiction.

4. The conferencing system terminal device of claim 3, the icon further comprising a hair depiction with the hair depiction passing behind the helix of the ear depiction.

5. The conferencing system terminal device of claim 1, the one or more processors further presenting, at the display, a prompt providing one or more corrective actions that may remediate an impairment of audio content being delivered by the audio output, wherein at least one corrective actions of the one or more corrective actions comprising a switch to a dictation mode of operation where voice is translated into text that can be sent to other conferencing system terminal devices of the video conference.

6. The conferencing system terminal device of claim 2, the one or more processors detecting actuation of an audio difficulties user actuation target from the user interface and presenting, at the display of the conferencing system terminal device, an audio difficulties prompt presenting a list of audio impairment types, with at least one audio impairment type of the list indicating that a person speaking in a language is speaking so fast that another person who is not a native speaker of the language finds it difficult to comprehend audio content emanating from the audio output.

7. The conferencing system terminal device of claim 6, wherein at least one other audio impairment type of the list instructing a chat window be opened for communication with other participants of the video conference.

8. The conferencing system terminal device of claim 7, wherein each audio difficulties user actuation target of the plurality of audio difficulties user actuation targets corresponding to the each participant of the video conference and comprises the icon.

9. The conferencing system terminal device of claim 1, the one or more processors presenting a plurality of video feeds depicting a plurality of participants of the video conference.

10. The conferencing system terminal device of claim 9, the plurality of audio difficulties user actuation targets being presented upon the display in a window positioned atop the plurality of video feeds depicting the plurality of participants of the video conference.

11. The conferencing system terminal device of claim 1, the icon depicting an ear with a slash therethrough.

12. A method in a conferencing system, the method comprising:
   detecting, by one or more processors of a conferencing system terminal device, actuation of a audio difficulties user actuation target that is presented in a plurality of audio difficulties user actuation targets actuatable by each participant of a plurality of participants to indicate audio difficulties being presented on a display of the conferencing system terminal device during a video conference without obscuring a plurality of video feeds of the video conference being presented on the display of the conferencing system terminal device, and with the plurality of audio difficulties user actuation targets arranged in a list with an icon presented adjacent to a name of the each participant on a one-to-one basis; and
   transmitting, with a communication device operable with the one or more processors, an audio difficulties data communication across a network to an audio difficulties monitoring engine operating at an audio or video conferencing system server complex.

13. The method of claim 12, further comprising:
   receiving, with the communication device, an audio difficulties response data communication from the audio difficulties monitoring engine operating at the audio or video conferencing system server complex; and
   presenting a prompt requesting that a video feed of the conferencing system terminal device be turned OFF during the video conference.

14. The method of claim 12, further comprising presenting, at a display of the conferencing system terminal device in response to the detecting the actuation of at least one audio difficulties user actuation target, a prompt presenting a plurality of predefined impairments in a list with a check box adjacent thereto with at least one predefined impairment indicating a presenter is speaking too quickly and at least one other predefined impairment presented as a blank to be filled in and requesting a selection of at least one predefined impairment from the plurality of predefined impairments.

15. A conferencing system terminal device, comprising:
   a display;
   an audio output;
   a user interface;
   a communication device; and
   one or more processors;
   the one or more processors presenting:
      a plurality of video feeds depicting participants of a video conference during the video conference in a grid on the display; and
      a plurality of audio difficulties user actuation targets on the display during the video conference in a list without obscuring any video feed of the plurality of video feeds;
   wherein:
      each audio difficulties user actuation target of the plurality of audio difficulty user actuation targets is defined by an icon depicting one of an ear, a loudspeaker, a hazardous condition sign, or headphones; and
      the plurality of audio difficulties user actuation targets arranged in a list with the icon presented adjacent to a name of each participant on a one-to-one basis.

16. The conferencing system terminal device of claim 15, wherein the icon depicts the ear with a slash therethrough.

17. The conferencing system terminal device of claim 15, wherein the icon depicts the loudspeaker with a red circle and slash superimposed thereon.

18. The conferencing system terminal device of claim 15, wherein the icon depicts the headphones with a slash thereacross.

19. The conferencing system terminal device of claim 15, wherein the icon depicts the ear with fingers of a hand positioned behind the helix of the ear.

20. The conferencing system terminal device of claim 15, wherein the plurality of audio difficulties user actuation targets comprises audio difficulty user actuation targets represented by the icon.

* * * * *